(12) United States Patent
Mitteer et al.

(10) Patent No.: US 12,732,048 B2
(45) Date of Patent: Sep. 8, 2026

(54) SYNCHRONOUS RELUCTANCE MOTOR HAVING A STATOR WITH STACKED LAMINATIONS AND A METHOD OF CONSTRUCTION

(71) Applicant: GHSP, Inc., Holland, MI (US)

(72) Inventors: David Michael Mitteer, Shelby, MI (US); Ryan David Rosinski, Whitehall, MI (US); Cathy Ann Stewart, Allendale, MI (US); Nathaniel Joseph McMackin, New Era, MI (US); Joseph Daniel Suchecki, Grand Haven, MI (US); George Holling, Whitefish, MT (US)

(73) Assignee: GHSP, INC., Holland, MI (US)

( * ) Notice: Subject to any disclaimer, the term of this patent is extended or adjusted under 35 U.S.C. 154(b) by 493 days.

(21) Appl. No.: 18/446,109

(22) Filed: Aug. 8, 2023

(65) Prior Publication Data

US 2024/0055923 A1 Feb. 15, 2024

Related U.S. Application Data

(60) Provisional application No. 63/397,520, filed on Aug. 12, 2022.

(51) Int. Cl.
*H02K 3/28* (2006.01)
*H02K 1/16* (2006.01)
(Continued)

(52) U.S. Cl.
CPC ................. *H02K 3/28* (2013.01); *H02K 1/16* (2013.01); *H02K 15/021* (2025.01); *H02K 15/12* (2013.01);
(Continued)

(58) Field of Classification Search
CPC ...... H02K 1/148; H02K 15/021; H02K 15/12; H02K 15/022; H02K 3/522; H02K 3/28; H02K 1/16
See application file for complete search history.

(56) References Cited

U.S. PATENT DOCUMENTS

| | | | | |
|---|---|---|---|---|
| 4,712,035 A * | 12/1987 | Forbes | H02K 1/148 | 310/216.081 |
| 6,225,725 B1 * | 5/2001 | Itoh | H02K 5/143 | 310/214 |

(Continued)

FOREIGN PATENT DOCUMENTS

| | | |
|---|---|---|
| CN | 105122594 A | 12/2015 |
| CN | 111293795 A | 6/2020 |
| JP | 11252842 A | 9/1999 |

*Primary Examiner* — Leda T Pham
(74) *Attorney, Agent, or Firm* — Price Heneveld LLP

(57) ABSTRACT

An electric motor includes a plurality of structural rings that define a plurality of stator teeth. Tooth sections are formed from stacks of laminations that are positioned within each stator tooth of the plurality of stator teeth. The stacks of laminations are positioned between adjacent rings of the plurality of structural rings. Bobbins are positioned over each stator tooth. Winding sections are positioned over each stator tooth and around the bobbins, respectively. The winding sections are coupled together to define a plurality of stator poles that are configured to be selectively energized. An outer ring is positioned around an outer circumference of the plurality of stator teeth. The outer ring defines a stator core and contains the winding sections within a stator cavity defined between the outer ring and an inner circumference of the plurality of structural rings.

20 Claims, 20 Drawing Sheets

(51) Int. Cl.

| | |
|---|---|
| ***H02K 15/021*** | (2025.01) |
| ***H02K 15/12*** | (2006.01) |
| *H02K 19/02* | (2006.01) |

(52) U.S. Cl.

CPC ......... *H02K 19/02* (2013.01); *H02K 2203/09* (2013.01); *H02K 2203/12* (2013.01)

(56) References Cited

U.S. PATENT DOCUMENTS

| | | | | |
|---|---|---|---|---|
| 6,304,018 | B1 * | 10/2001 | Ham ........................ | H02K 1/12<br>310/216.061 |
| 6,509,667 | B1 * | 1/2003 | El-Antably ............ | H02K 15/02<br>310/43 |
| 8,816,550 | B2 * | 8/2014 | Kim ..................... | B62D 5/0403<br>310/43 |
| 10,153,670 | B2 * | 12/2018 | Büttner .................. | H02K 1/246 |
| 11,133,723 | B2 | 9/2021 | Hirsch et al. | |
| 11,146,149 | B2 | 10/2021 | Rosinski et al. | |
| 2003/0127933 | A1 * | 7/2003 | Enomoto ............. | H02K 15/022<br>310/194 |
| 2019/0348893 | A1 | 11/2019 | Rosinski et al. | |

* cited by examiner

SYNCHRONOUS RELUCTANCE MOTOR HAVING A STATOR WITH STACKED LAMINATIONS AND A METHOD OF CONSTRUCTION

CROSS-REFERENCE TO RELATED APPLICATION

This application claims priority to and the benefit under 35 U.S.C. § 119(e) of U.S. Provisional Patent Application No. 63/397,520, filed on Aug. 12, 2022, entitled SYNCHRONOUS RELUCTANCE MOTOR HAVING A STATOR WITH STACKED LAMINATIONS AND A METHOD OF CONSTRUCTION, the entire disclosure of which is hereby incorporated herein by reference.

FIELD OF THE INVENTION

The present invention generally relates to electric motors, and more specifically, a synchronous reluctance motor having a series of stacked tooth laminations that are coupled together to form a continuous stator. Additionally, separate bobbins and winding sections can be attached to each formed tooth of the stator. The winding sections can also be attached together to form the stator winding. The stator can be overmolded such that each individual tooth and winding section can be covered and insulated by the overmold material.

BACKGROUND OF THE INVENTION

Electric motors typically include a stator and a rotor, where the stator includes a winding that can be energized to form an electromagnetic field that interacts with a rotor. The interaction between the electromagnetic field of the stator and the rotor produces an electromotive force that rotates the rotor relative to the stator.

SUMMARY OF THE INVENTION

According to a first aspect of the present disclosure, an electric motor includes a plurality of structural rings that define a plurality of stator teeth. Tooth sections are formed from stacks of laminations that are positioned within each stator tooth of the plurality of stator teeth. The stacks of laminations are positioned between adjacent rings of the plurality of structural rings. Bobbins are positioned over each stator tooth. Winding sections are positioned over each stator tooth and around the bobbins, respectively. The winding sections are coupled together to define a plurality of stator poles that are configured to be selectively energized. An outer ring is positioned around an outer circumference of the plurality of stator teeth. The outer ring defines a stator core and contains the winding sections within a stator cavity defined between the outer ring and an inner circumference of the plurality of structural rings.

According to another aspect, a motor includes a plurality of tooth segments. Each tooth segment includes stacked tooth laminations that form a core portion and a tooth portion, a bobbin that is slidably positioned over the tooth portion of the stacked tooth laminations, and a winding section that is positioned around the bobbin. Each tooth segment is coupled to two adjacent tooth segments to form a ring with the plurality of tooth segments that extend inward, and the winding sections of the plurality of tooth segments are coupled together to define a plurality of stator poles that are configured to be selectively energized.

According to another aspect, a method for forming a stator for an electric motor includes placing a bottom structural ring within a die, placing layers of stacked tooth laminations onto the bottom structural ring, positioning in an alternating configuration intermittent structural rings between adjacent layers of the stacked tooth laminations, placing a top structural ring on a top layer of the layers of the stacked tooth laminations to form a laminated stator, removing the laminated stator from the die, and positioning a bobbin assembly on each tooth of the laminated stator to define a segmented stator winding. Each bobbin assembly includes a bobbin member and a pre-wound winding section. The method further includes placing an outer ring around the segmented stator winding and the laminated stator, and overmolding the laminated stator and the segmented stator winding with an overmold material.

According to another aspect, a method for forming a stator for an electric motor includes forming a plurality of laminated tooth segments, placing a bobbin assembly onto a tooth portion of each respective laminated tooth segment of the plurality of laminated tooth segments to define a plurality of stator segments. The bobbin assembly includes a bobbin member and a winding section. The method further includes attaching the plurality of stator segments to form a pre-wound stator core, attaching a winding bracket to the winding sections of the pre-wound stator core to form a stator winding of the pre-wound stator core, and overmolding the pre-wound stator core with an overmold material.

According to another aspect, a method for forming a rotor for an electric motor includes forming steel laminations that have reluctance sections removed from each of the steel laminations, stacking the steel laminations to form a rotor body, wherein the reluctance sections are aligned to define reluctance voids within the rotor body, disposing opposing ends on the rotor body to enclose the reluctance voids, and overmolding the rotor structure with an overmold material. The opposing end caps prevent infiltration of the overmold material into the reluctance voids.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
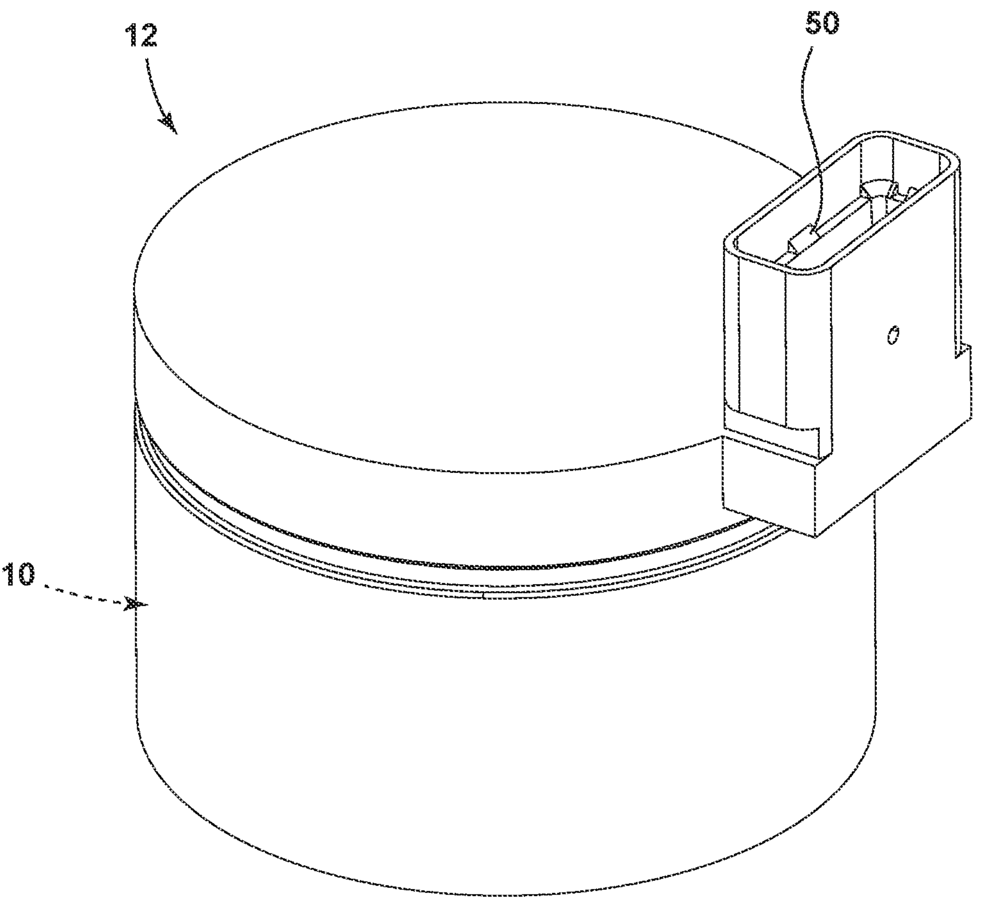
FIG. 1 is a perspective view of an electric motor that incorporates an aspect of the stator and rotor configurations described herein.
Figure 2:
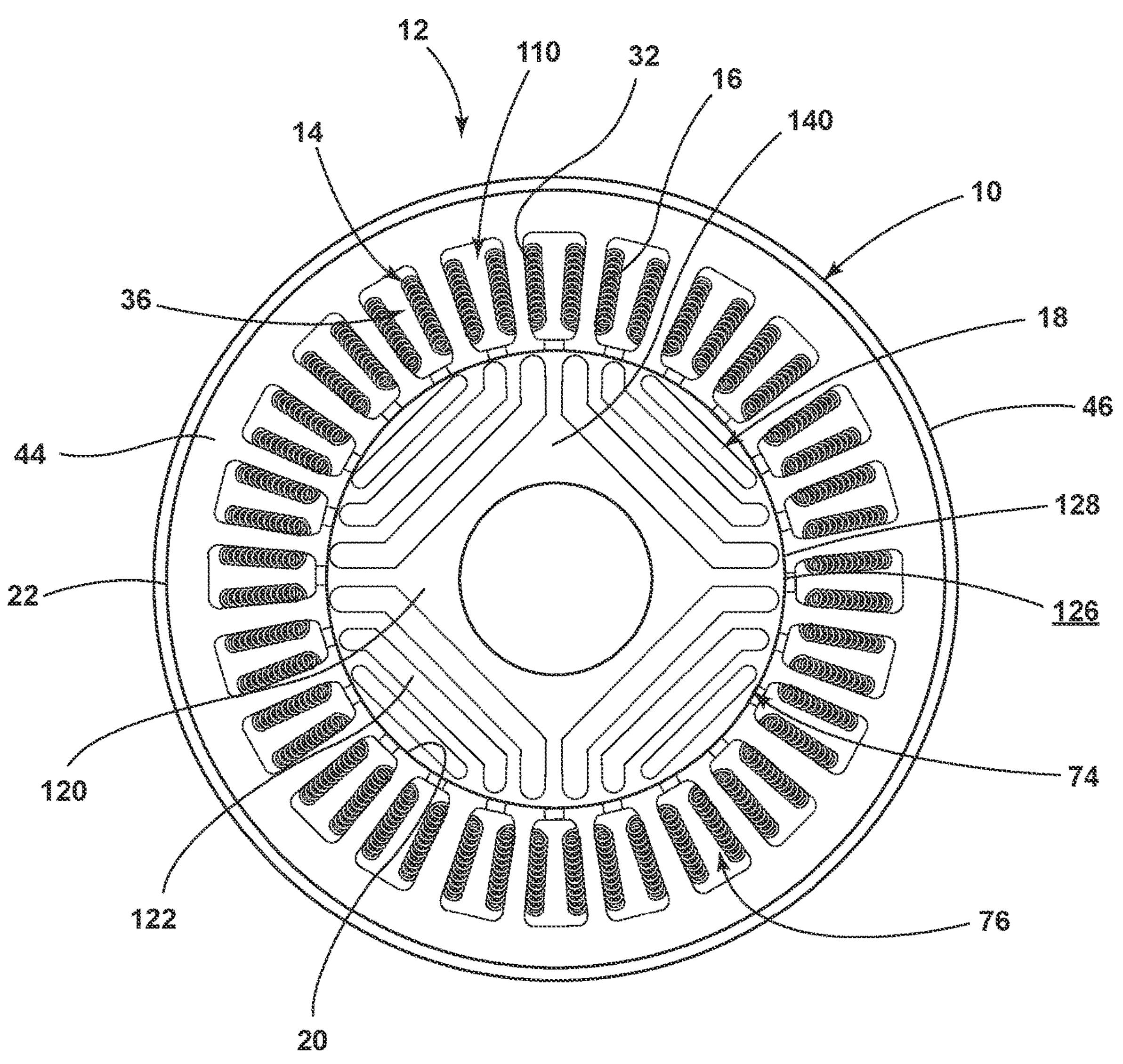
FIG. 2 is a schematic cross-sectional view of the electric motor of FIG. 1, taken along line II-II.
Figure 3:
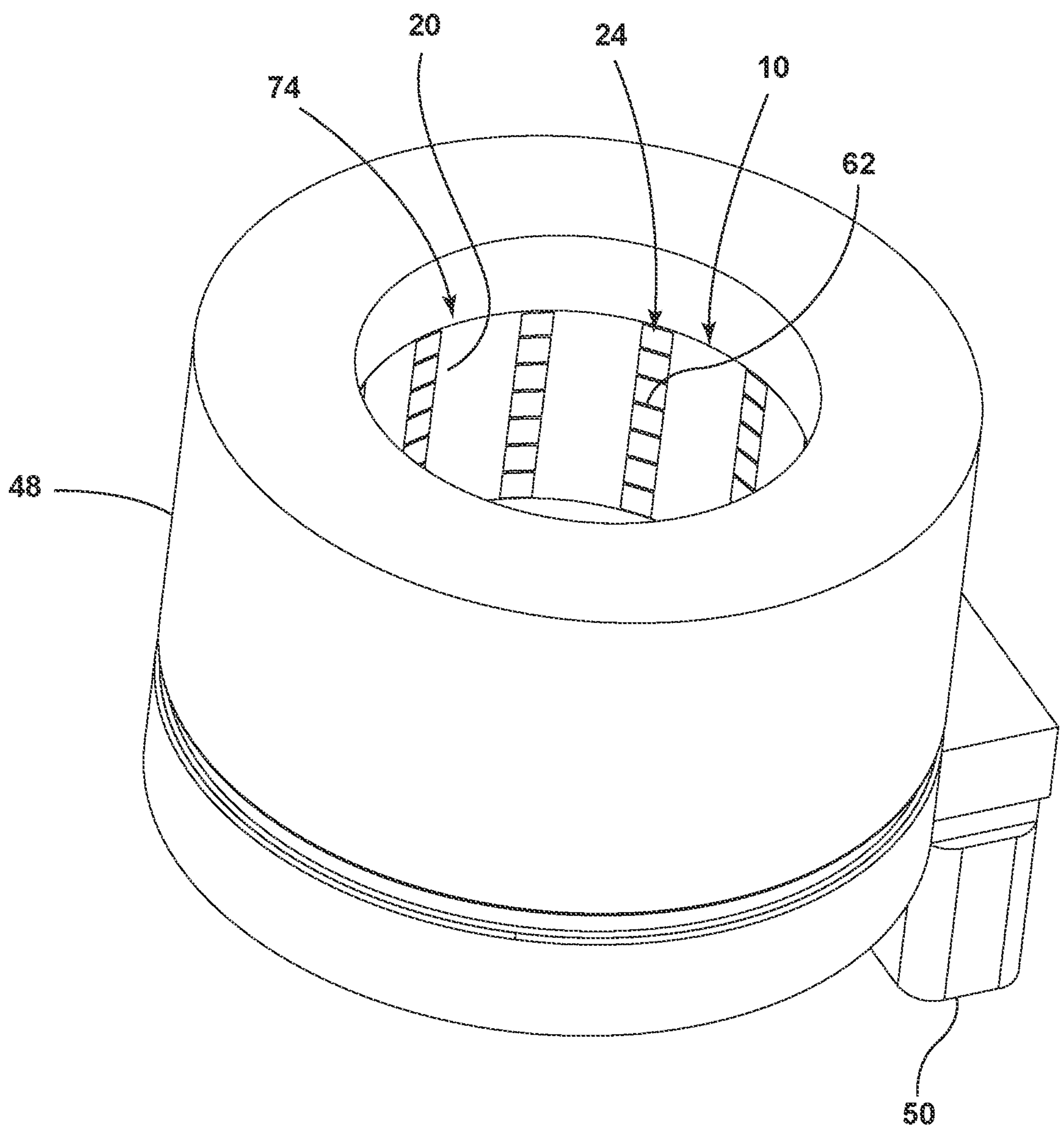
FIG. 3 is a perspective view of a stator that incorporates an outer ring positioned around an outer circumference of teeth for a stator.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms “upper,” “lower,” “right,” “left,” “rear,” “front,” “vertical,” “horizontal,” and derivatives thereof shall relate to the concepts as oriented in FIGS. 1-18. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an electric motor having a formed and overmolded stator with pre-wound winding sections that are attached to the teeth of the stator and an overmolded rotor that includes hollow reluctance voids that are contained between outer laminations. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term “and/or,” when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms “comprises,” “comprising,” or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by “comprises . . . a” does not, without more constraints, preclude the existence of additional identical elements in the process, method, article, or apparatus that comprises the element.

As used herein, the term “about” means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term “about” is used in describing a value or an end-point of a range, the disclosure should be understood to include the specific value or end-point referred to. Whether or not a numerical value or end-point of a range in the specification recites “about,” the numerical value or end-point of a range is intended to include two embodiments: one modified by “about,” and one not modified by “about.” It will be further understood that the end-points of each of the ranges are significant both in relation to the other end-point, and independently of the other end-point.

The terms “substantial,” “substantially,” and variations thereof as used herein are intended to note that a described feature is equal or approximately equal to a value or description. For example, a “substantially planar” surface is intended to denote a surface that is planar or approximately planar. Moreover, “substantially” is intended to denote that two values are equal or approximately equal. In some embodiments, “substantially” may denote values within about 10% of each other, such as within about 5% of each other, or within about 2% of each other.

As used herein the terms “the,” “a,” or “an,” mean “at least one,” and should not be limited to “only one” unless explicitly indicated to the contrary. Thus, for example, reference to “a component” includes embodiments having two or more such components unless the context clearly indicates otherwise.

Referring now to FIGS. 1-18, reference numeral 10 generally refers to a stator 10 that is incorporated within an electric motor 12, where the stator 10 includes one or more windings 14 that are positioned on teeth 16 for the stator 10. The windings 14 are energized to produce a magnetic field that rotates a rotor 18 that is positioned relative to the stator 10. The windings 14 are typically energized by a controller that manages the delivery of an electrical current to the one or more phases of the winding 14. The rotor 18 can be positioned within an inner circumference 20 of the stator 10 or can be positioned outside of the outer circumference 22 of the stator 10 depending upon the configuration of the electric motor 12. Typically, the configurations described herein are directed to a rotor 18 that rotates within the inner circumference 20 of the stator 10. Accordingly, the configurations described herein are directed to devices and methods for building a stator 10 and positioning a winding 14 for the stator 10 on an inner-rotor configuration motor 12.

Referring now to FIGS. 3-9, the motor 12 includes a stator 10 that is made up of a plurality of structural rings 24 that can define a number of stator teeth 16 that are included within the stator 10. Tooth sections 26 are made up of stacks 28 of tooth laminations 30. The stacks 28 of tooth laminations 30 are positioned within each tooth 16 and between adjacent structural rings 24. Accordingly, each stator tooth 16 of the stator 10 is made up of an alternating configuration of structural rings 24 and stacks 28 of tooth laminations 30 that cooperate to form the stator teeth 16. Bobbins 30 are positioned around a portion of each tooth 16 for the stator 10. Winding sections 34 of electrically conducting material are slidably positioned over the bobbins 30, respectively, for each tooth 16 of the stator 10. At this point the winding sections 34 are separated from one another as they are installed onto the plurality of stator teeth, respectively. The winding sections 34 are coupled together to define a continuous winding 14 for the stator 10 that forms a plurality of stator poles 36 that are configured to be selectively energized to produce an electromagnetic field.

An outer ring 38 is positioned around the outer circumference 22 of the teeth 16 for the stator 10. The outer ring 38 operates as a back iron 40 and also serves to contain the winding sections 34 within a stator cavity 42. This stator cavity 42 is defined within the outer ring 38 and outside of the connecting portions 62 of the structural rings 24 that extend radially between adjacent stator teeth 16. Stated another way, the stator cavity 42 is defined within the outer ring 38 and outside of a core 44 for the stator 10 from which the teeth 16 of the stator 10 extends, where the core 44 is made up of the connecting portions of the structural rings 24. An overmold 46 extends around the outer ring 38, the winding sections 34, the plurality of teeth 16, and the core 44 to form an overmolded stator 10. In certain aspects of the device, the outer ring 38 can include alignment channels 52 that interact with alignment protrusions 54 of the tooth sections 26 that are made up of the structural rings 24 and the stacks of tooth laminations 30. In this manner, the outer ring 38 can be aligned in one or more desired orientations with respect to the tooth sections 26 of the stator 10. This can also be used as a securing device to ensure a secure fit between the outer ring 38 and the tooth sections 26 that form the stator cavity 42 that secured the winding sections 34.

In certain aspects of the device, as exemplified in FIGS. 3-9, the winding sections 34 can be connected together using a winding bracket 48. This winding bracket 48 includes a plurality of connectors 50 that link particular winding sections 34 together. The connectors 50 attach to the wire ends 60 of the winding sections 34 to complete the winding 14. Certain wire ends 60 are not attached to the connectors 50 so that they can be attached to the wiring for delivering current through the winding 14. These wire ends 60 that are not connected to the connectors 50 of the winding bracket 48 can be positioned to extend out from the overmold 46 to connect with the electrical leads to and from the power source. The winding sections 34 are coupled together by the winding bracket 48 that defines subsets 64 of the winding sections 34. These subsets 64 form the various phases of the winding 14 that are in electrical communication with one another. The winding bracket 48 includes a plurality of winding connections 72 that form the subsets 64 of the winding sections 34. Again, the subsets 64 of the winding sections 34 correspond to phases of the plurality of stator poles 36. By way of example, and not limitation, the plurality of winding connections 72 can include three winding connections that correspond to three phases of the plurality of stator poles 36. The winding connections 72 of the winding bracket 48, to define the various phases, are typically separated by an insulating spacer 82 that electrically separates the winding connections 72. The insulating spacers 82 provide for the delivery of dedicated and separate electrical currents to the subsets 64 of winding sections 34 to produce the multi-phase operation of the stator 10.

Through this configuration, the stator 10, being an inner-rotor configuration, is able to be wound from the outer circumference 22 before the outer ring 38 is placed around the winding sections 34. The outer ring 38 can then be placed around the stator 10 to contain the winding sections 34 on the teeth 16 of the stator 10. This configuration allows the inner-rotor configuration of the stator 10 to be manufactured, without the need to locate the windings 14 within the confined space inside the rotor cavity 74 of the stator 10. Additionally, the windings 14 can be applied as the pre-wound winding sections 34, as is described more fully herein.

Figure 4:
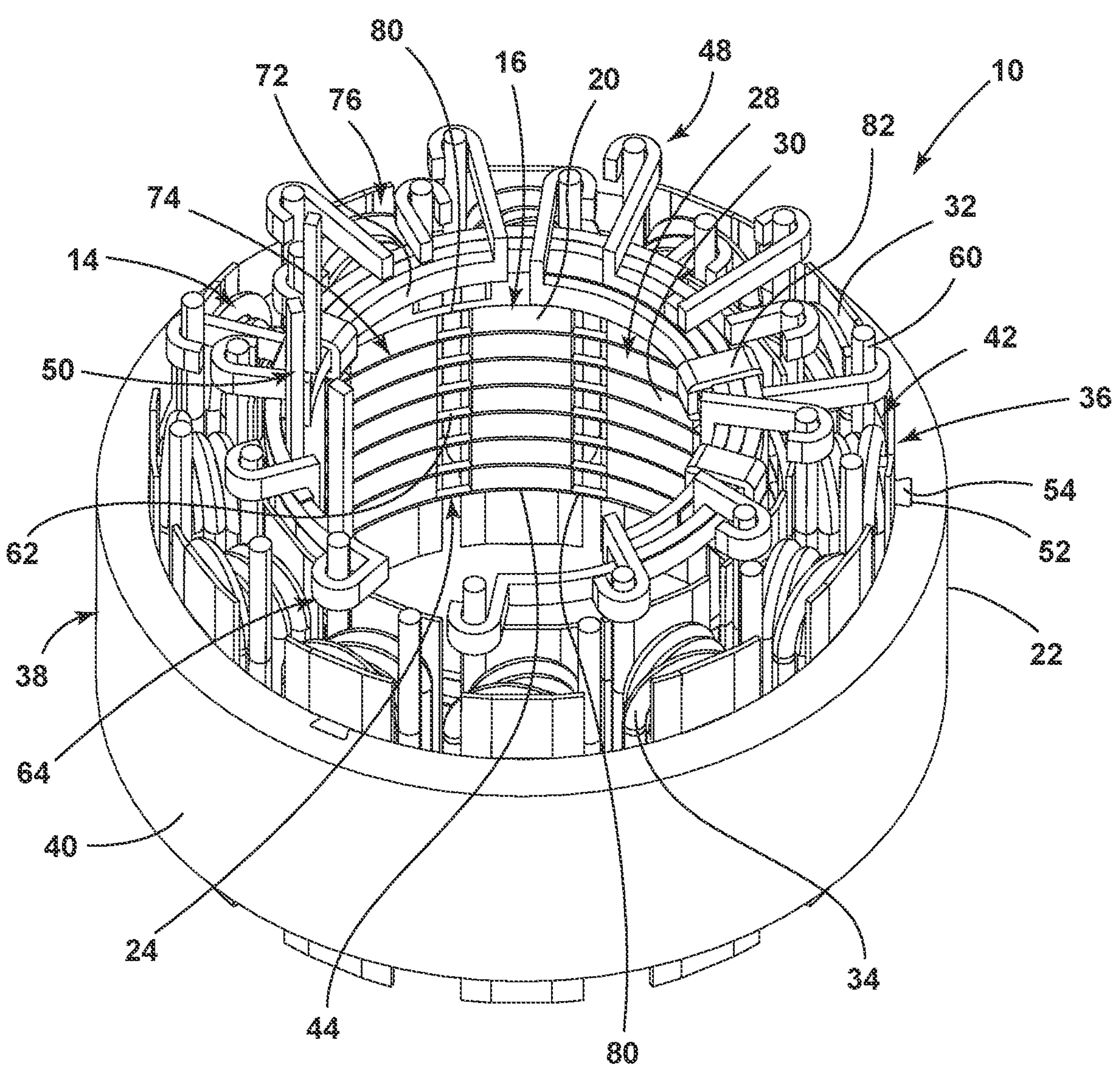
FIG. 4 is a partially exploded perspective view of the stator of FIG. 3, with the stator separated from an overmold.
Figure 5:
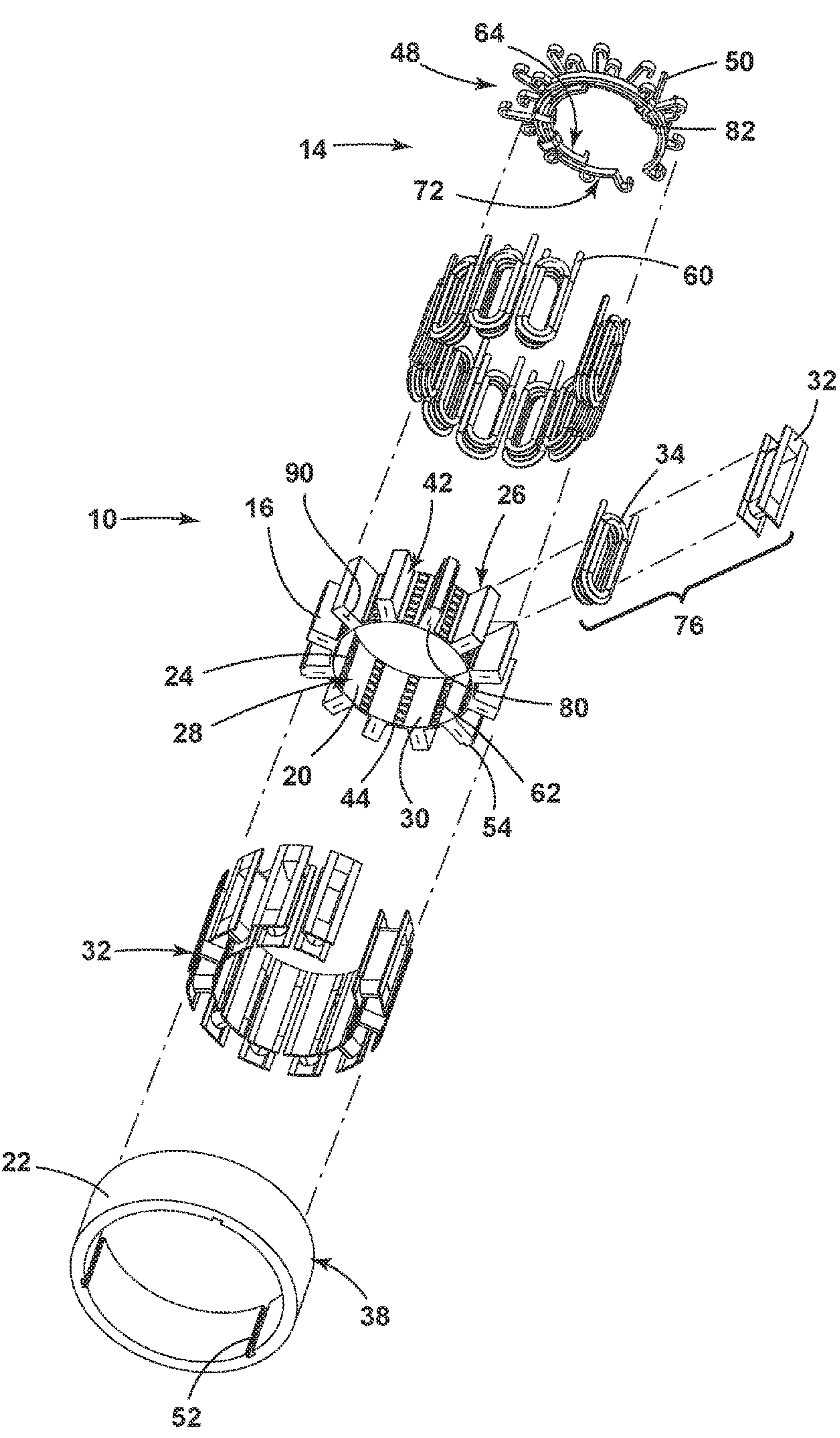
FIG. 5 is an exploded perspective view of the stator of FIG. 4.
Figure 6:
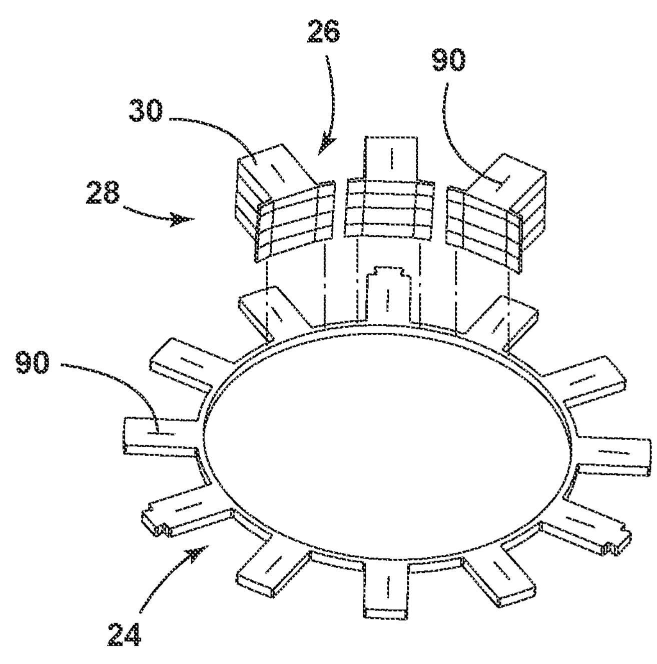
FIG. 6 is a schematic perspective view showing assembly of the stator teeth for the stator of FIG. 5 using the structural ring and stacked tooth laminations.
Figure 7:
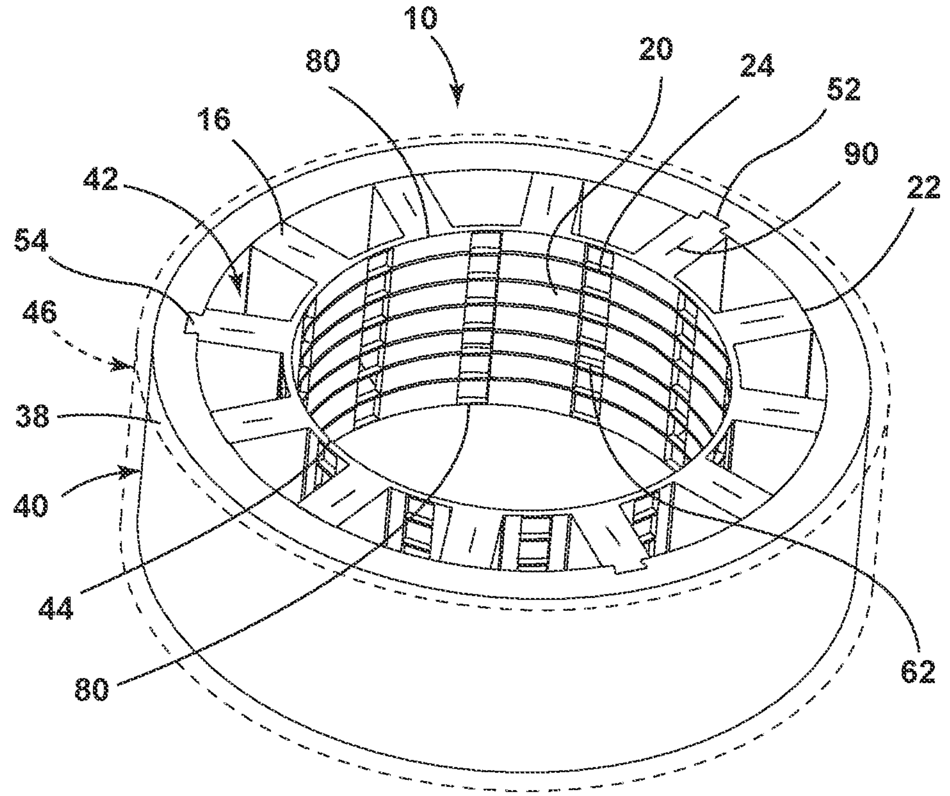
FIG. 7 is a top perspective view of the stator core of the stator of FIG. 5 is a side perspective view of a stack of tooth laminations that are positioned between adjacent structural rings for forming the stator of FIG. 2.
Figure 8:
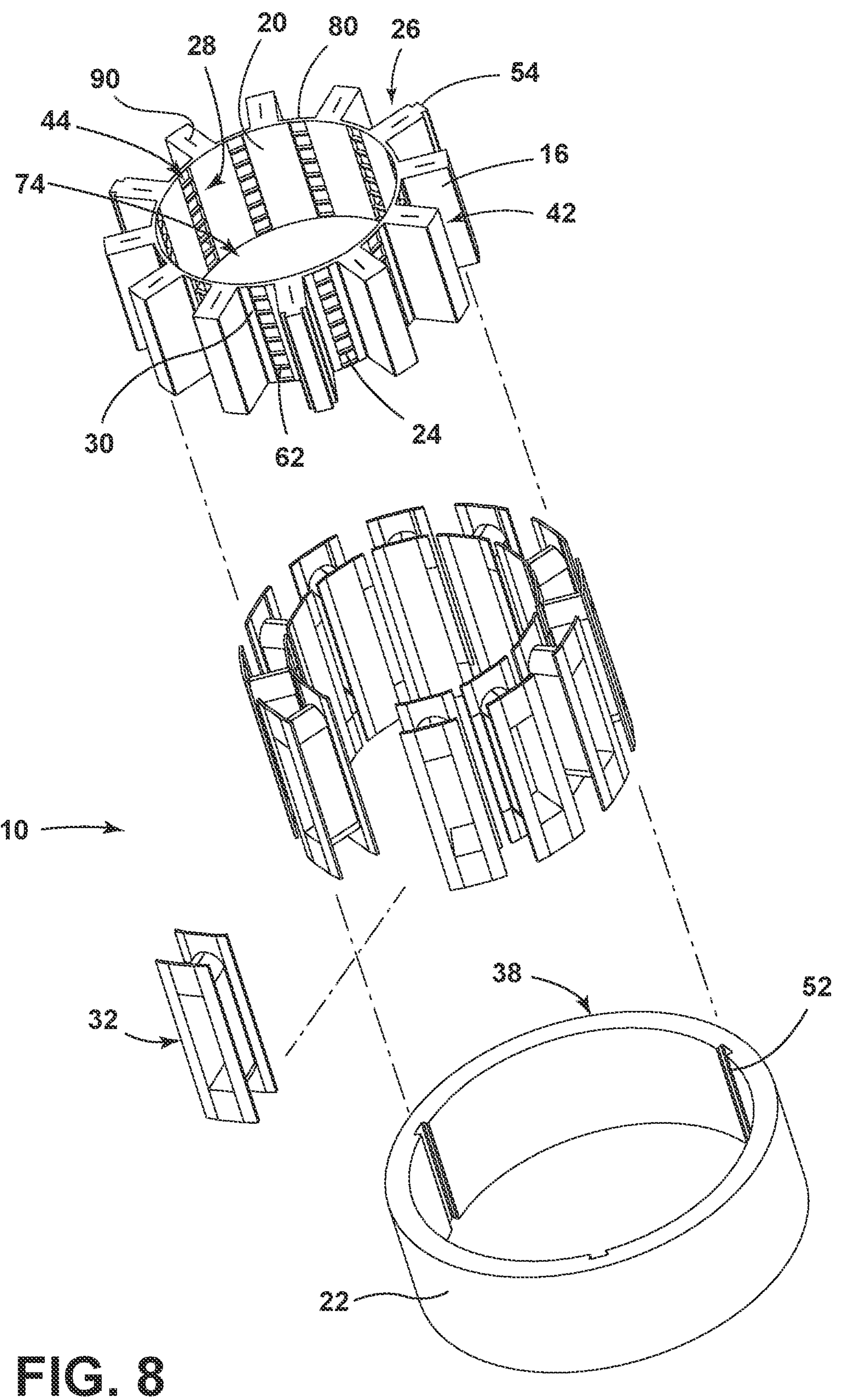
FIG. 8 is an exploded perspective view of the stator core of FIG. 7.
Figure 9:
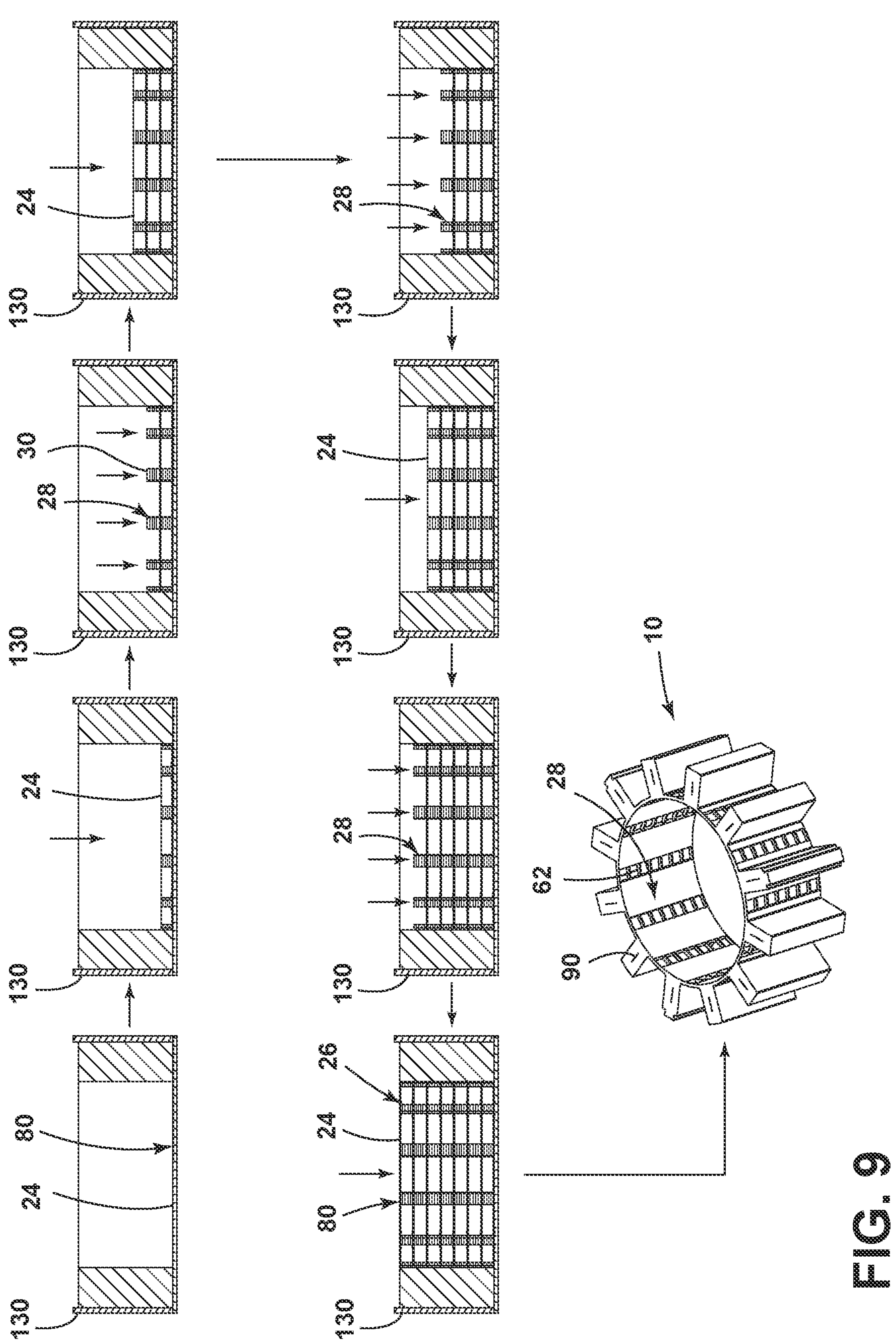
FIG. 9 is a schematic diagram illustrating assembly of the stator teeth of the stator core using structural rings and stacked tooth laminations.
Figure 10:
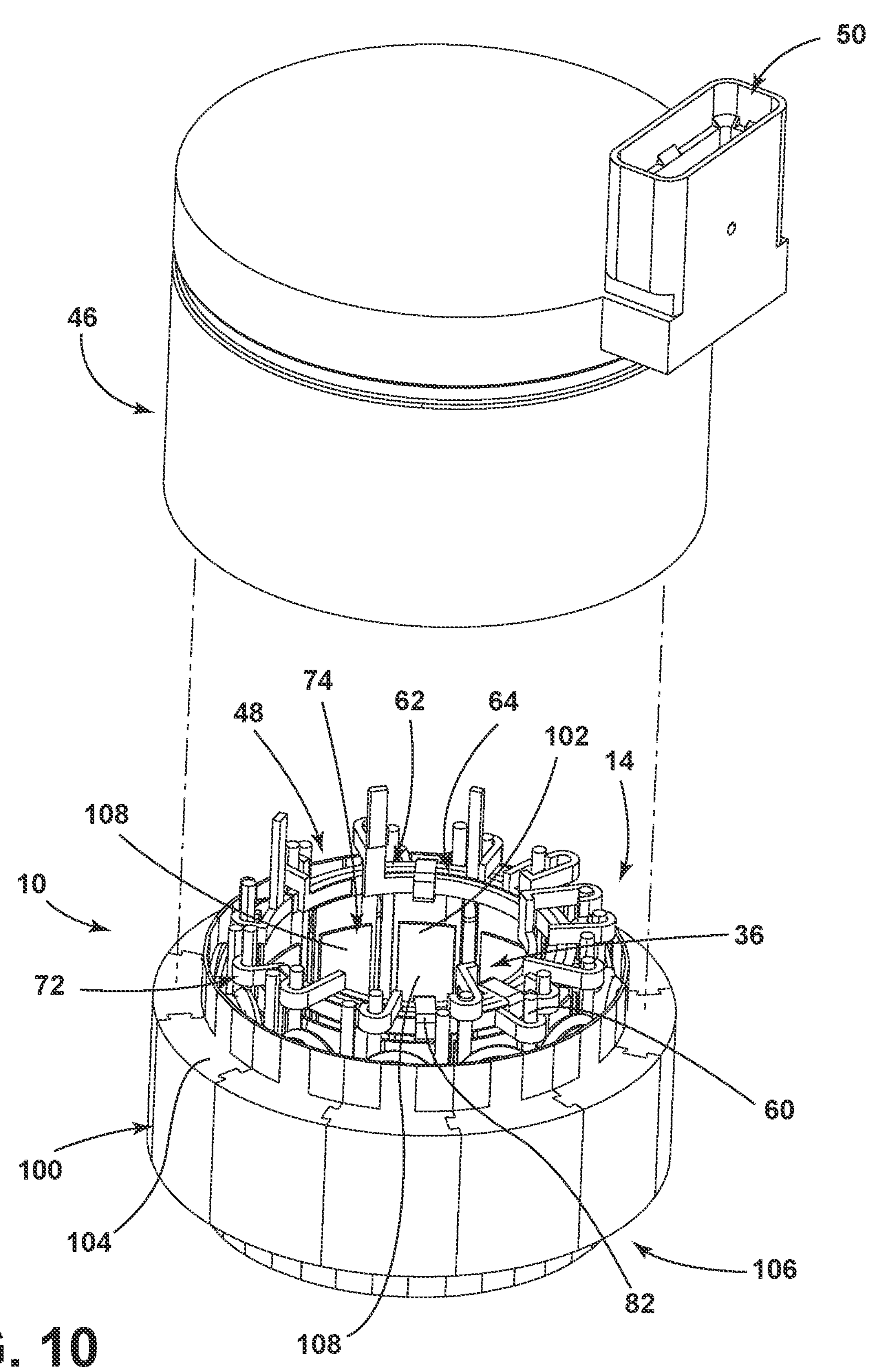
FIG. 10 is a partially exploded view of a stator that incorporates a plurality of pre-wound tooth segments and showing the stator separated from an overmold.
Figure 11:
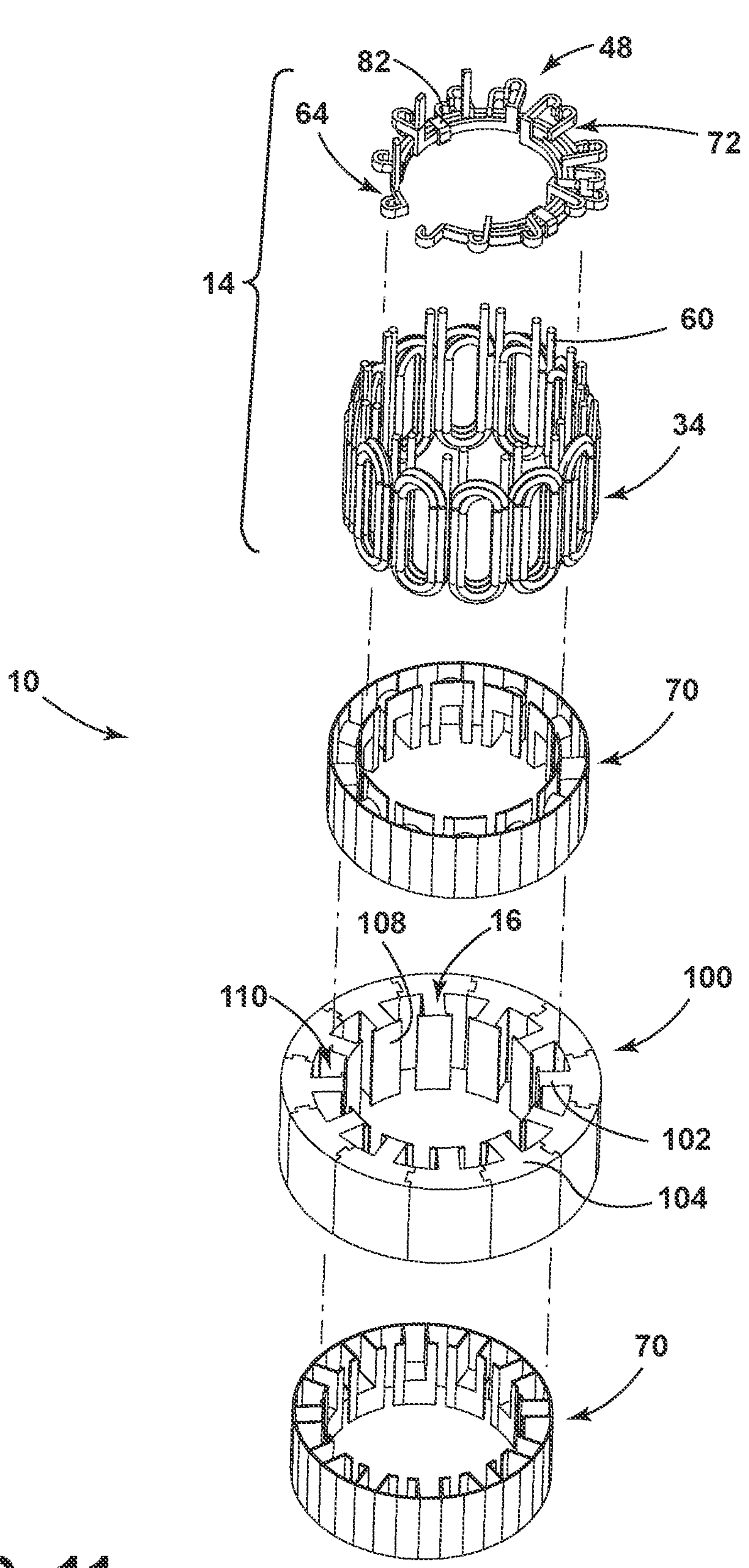
FIG. 11 is an exploded perspective view of the stator of FIG. 10.
Figure 12:
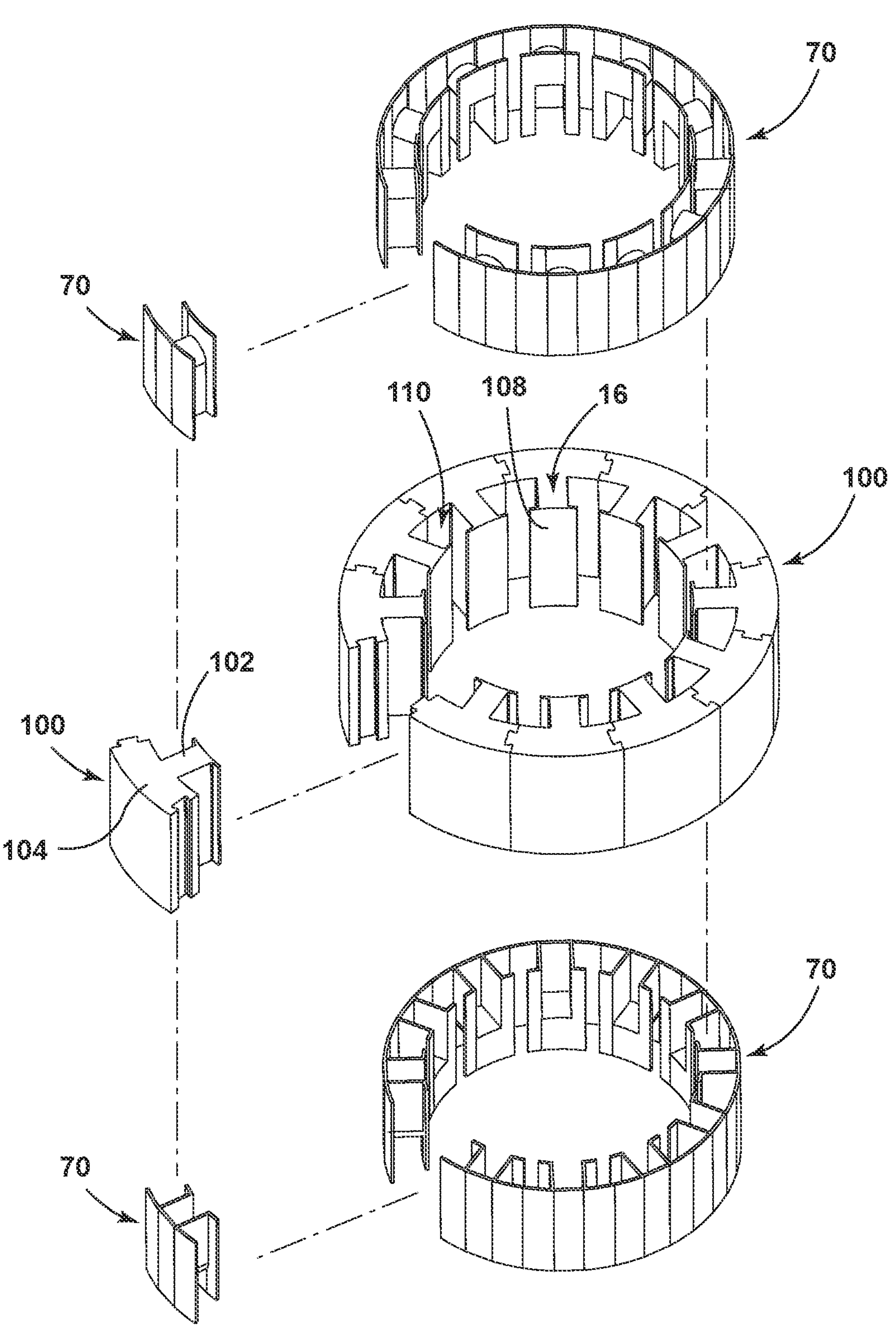
FIG. 12 is an exploded perspective view of the stator core shown in FIG. 11.
Figure 13:
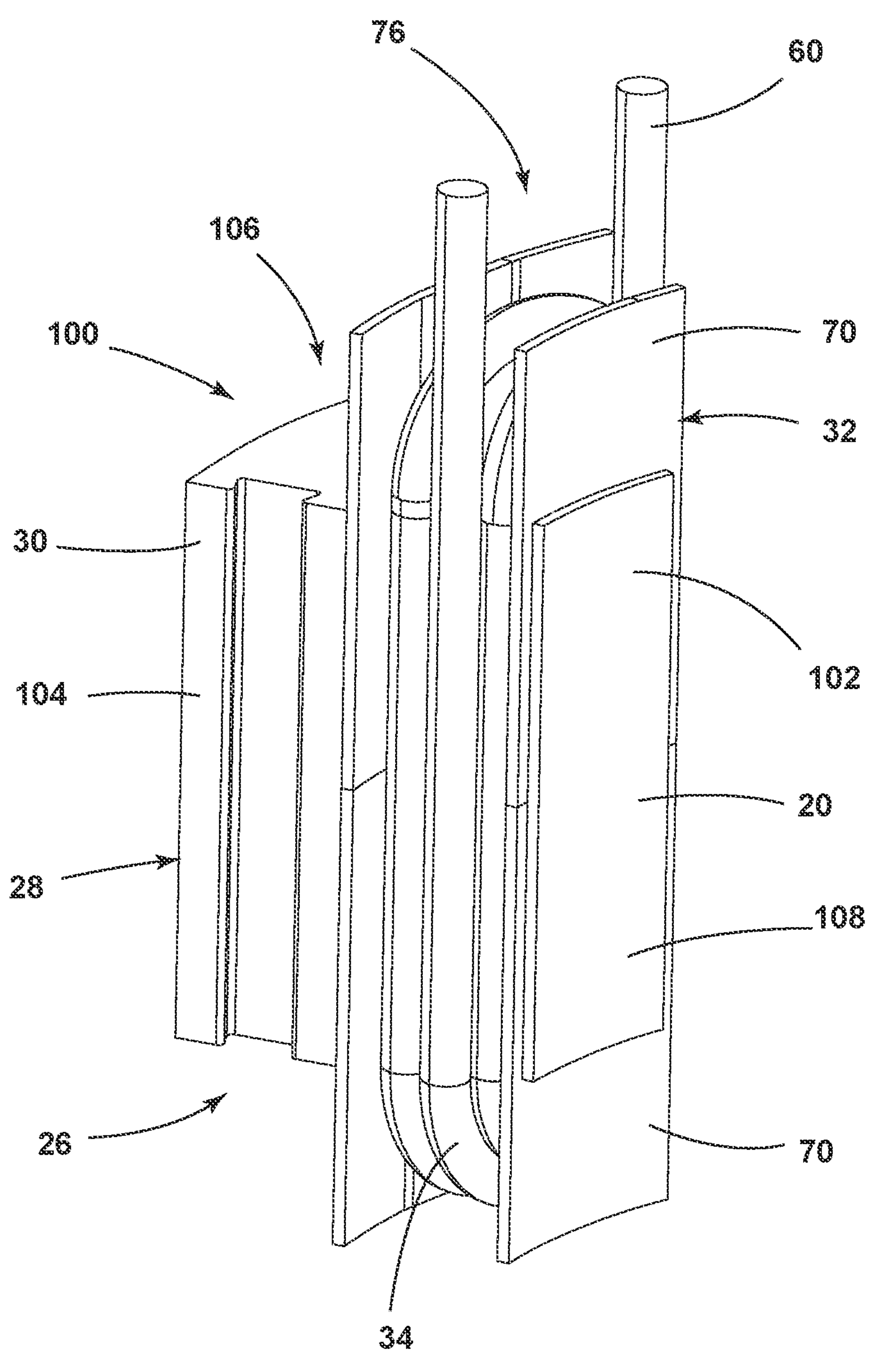
FIG. 13 is a perspective view of a pre-wound tooth segment of the stator of FIG. 10.
Figure 14:
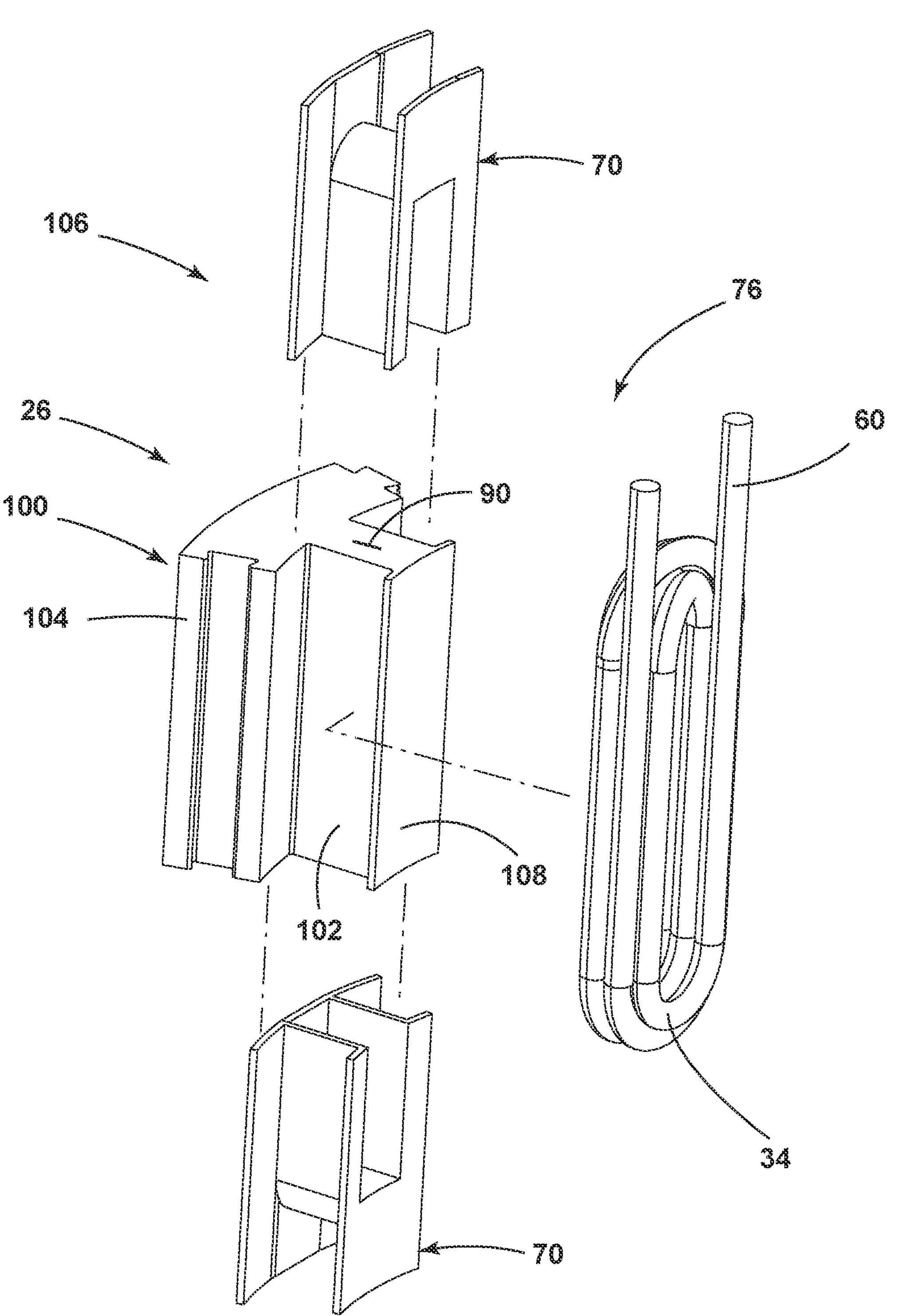
FIG. 14 is an exploded perspective view of the pre-wound tooth segment of FIG. 13.
Figure 15:
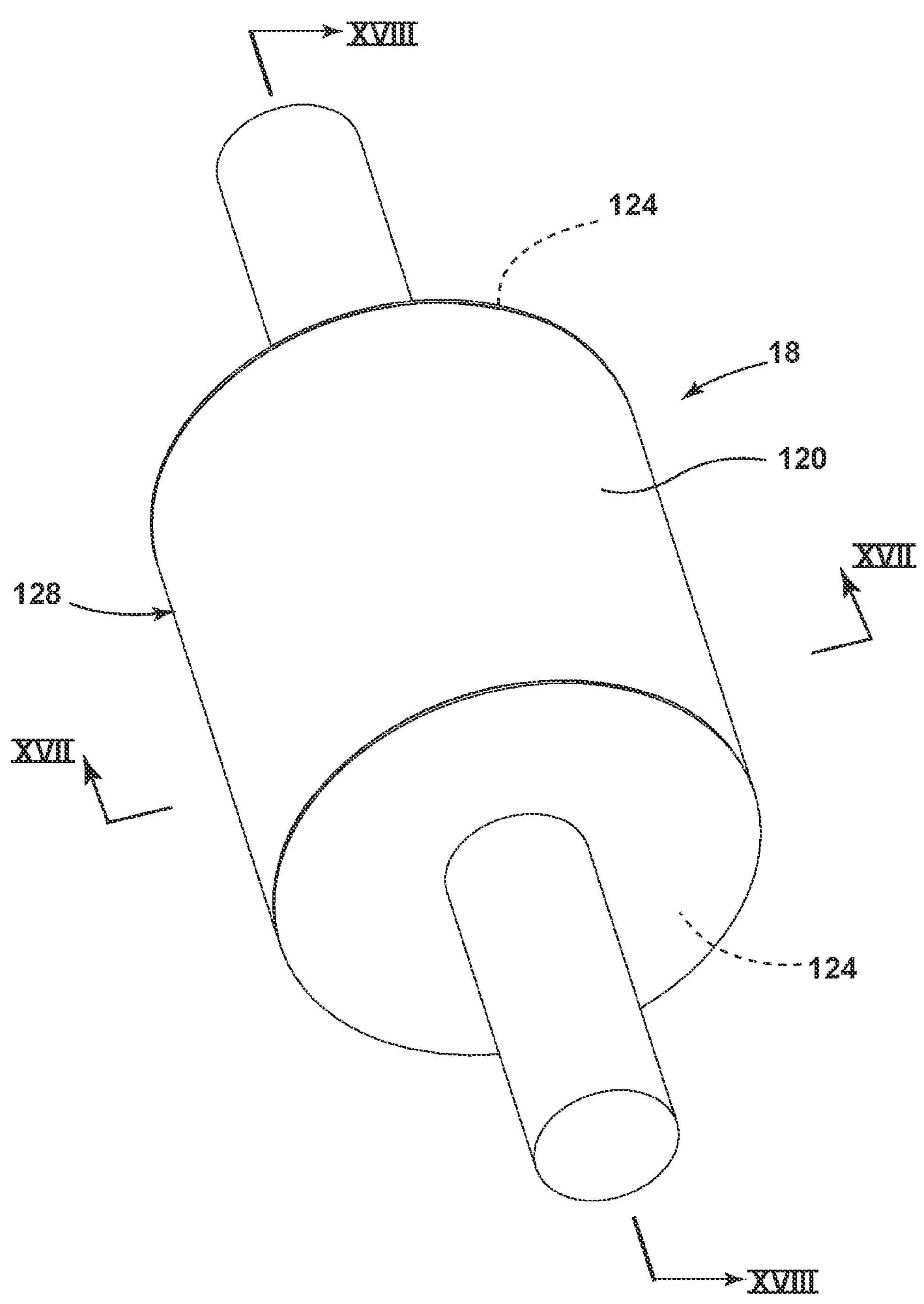
FIG. 15 is a perspective view of a rotor that incorporated reluctance voids within a rotor body.
Figure 16:
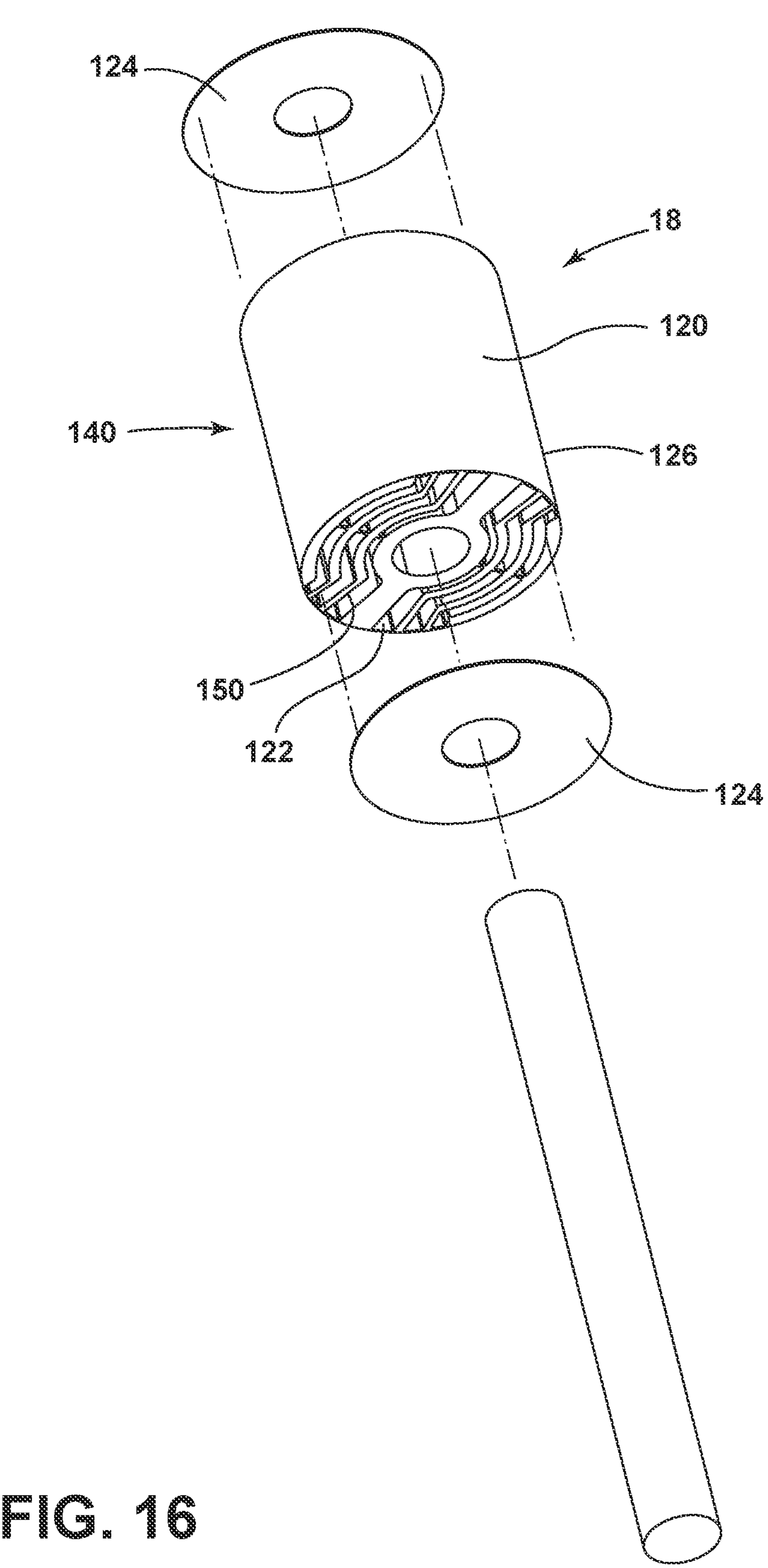
FIG. 16 is an exploded perspective view of the rotor of FIG. 15.
Figure 17:
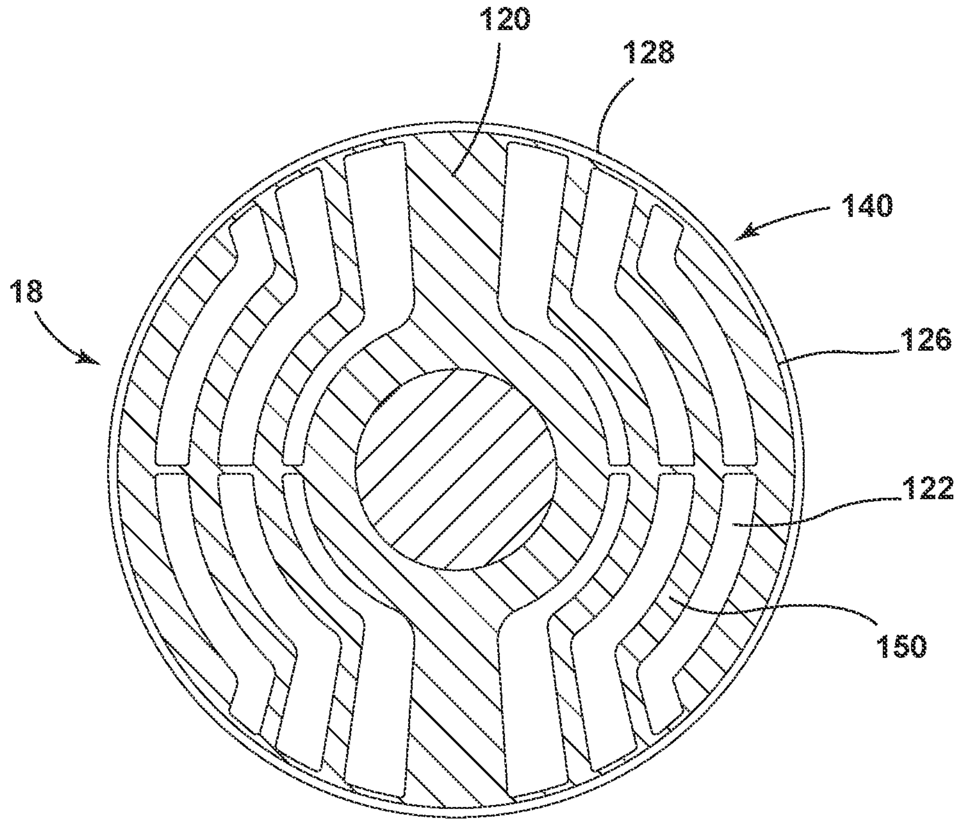
FIG. 17 Is a cross sectional view of the stator of FIG. 15 taken along XVII-XVII.
Figure 18:
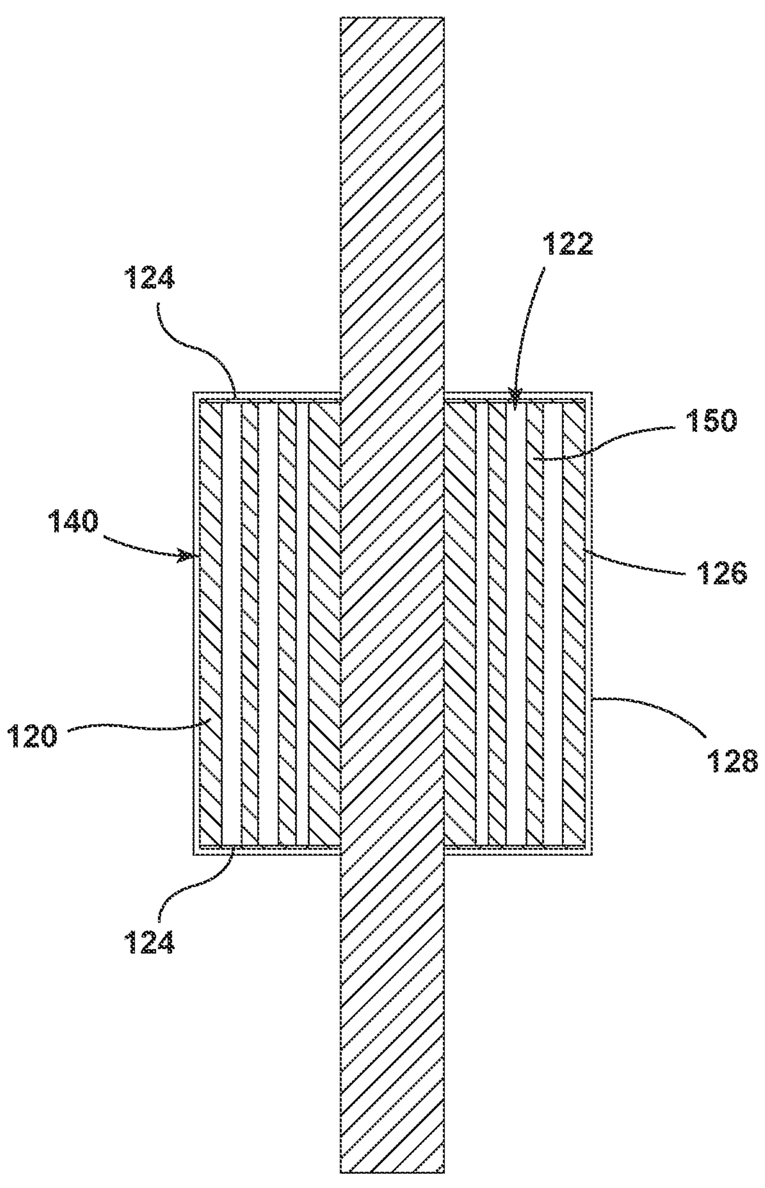
FIG. 18 Is a cross sectional view of the stator of FIG. 15 taken along XVIII-XVIII.
Figure 19:
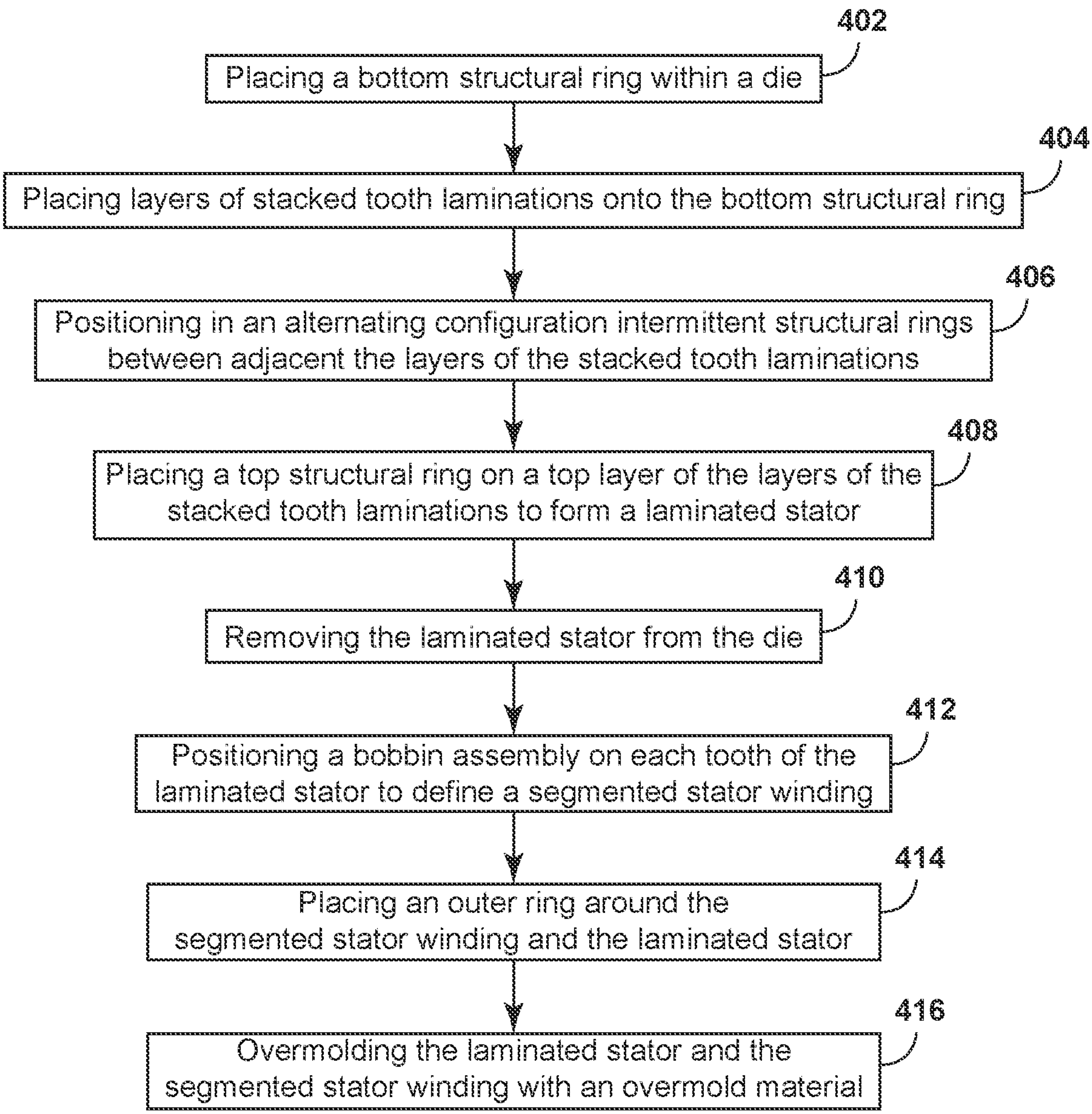
FIG. 19 is a schematic flow diagram illustrating a method for forming a stator for an electric motor.
Figure 20:
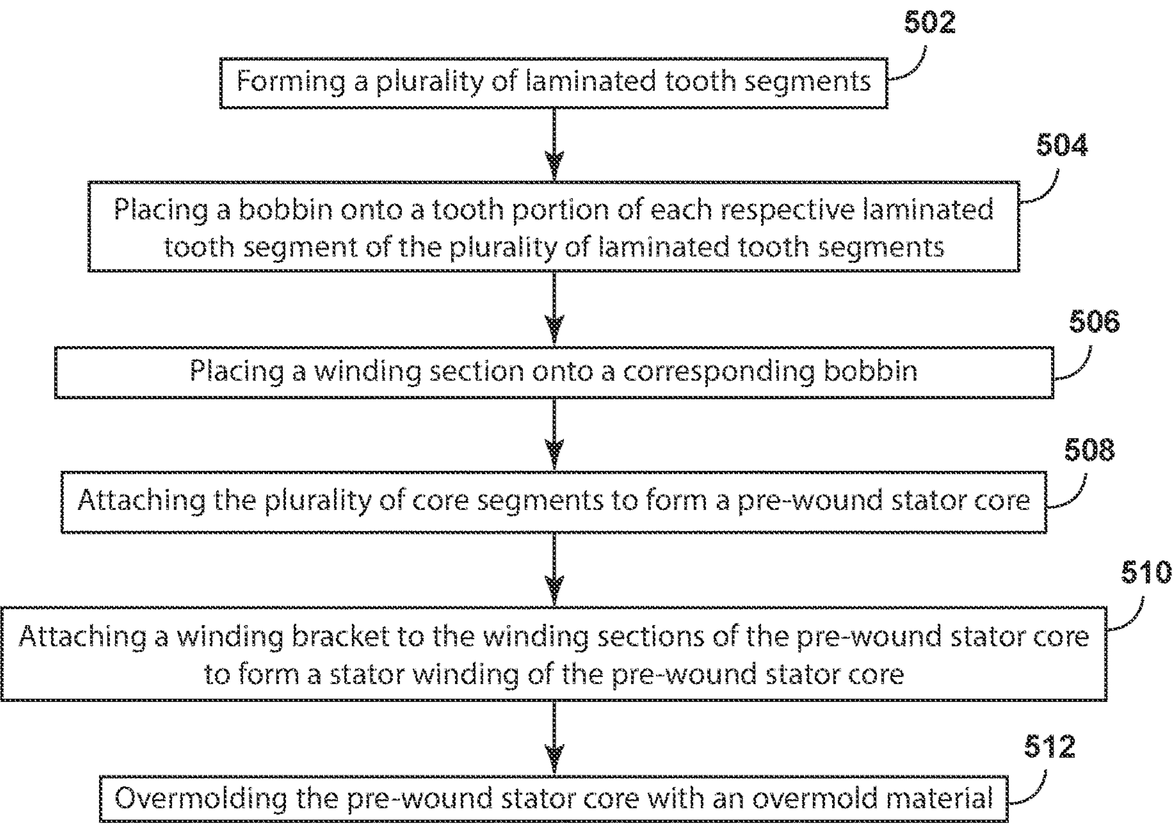
FIG. 20 is a schematic flow diagram illustrating a method for forming a stator for an electric motor.
Figure 21:
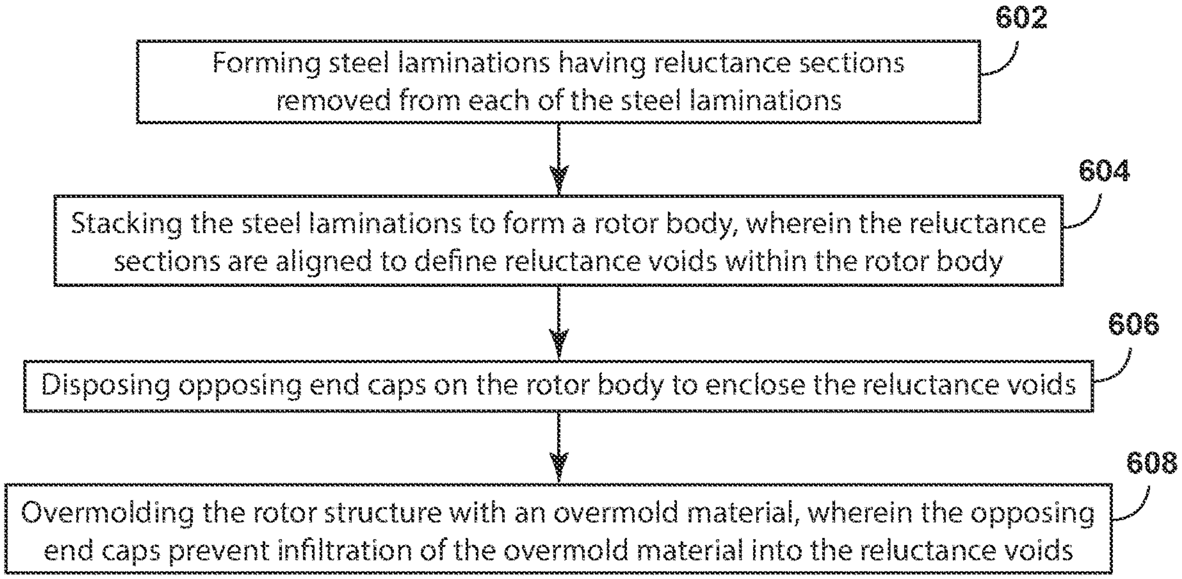
FIG. 21 is a schematic flow diagram illustrating a method for forming a stator for an electric motor.

According to the various aspects of the device, as exemplified in FIGS. 4 and 5, the winding sections 34 that are slidably positioned over each bobbin 32 and over each tooth 16 for the stator 10 can be pre-wound as a formed winding section 34. Each winding section 34 is then placed over a bobbin 32 for a respective tooth 16 of the stator 10. In certain aspects of the device, the winding section 34 can be placed on the bobbin 32 and the bobbin 32, having the winding section 34 thereon, can be placed on the respective tooth 16 of the stator 10. Accordingly, the winding section 34 and the corresponding bobbin 32 member form a bobbin assembly 76 that is placed, as a single component, over a corresponding stator tooth 16. Using this configuration, a plurality of winding sections 34 and a plurality of bobbins 30 can be pre-manufactured and paired for installation on the stator teeth 16. Wire ends 60 extend from each winding section 34 can be connected to the adjacent winding sections 34 to form one or more continuous windings 14 that extend around the stator 10. After the winding sections 34 are connected together to form the continuous winding or windings 14, the overmold 46 is defined by placing an overmold material over the components to form the now insulated stator 10.

As exemplified in FIGS. 3-9, the various bobbins 30 that extend over the teeth 16 for the stator 10 can be formed by one or more bobbin sections 70 or end caps that are slidably positioned over each tooth 16 having an enlarged tooth end 108. As exemplified in FIGS. 13-14, in various aspects of the device, the bobbin 32 can include two opposing bobbin sections 70 that slide over and encircle each tooth 16 and behind the tooth end from opposing directions, such as from above and below, or from side to side, to form the complete structure of the bobbin 32. The winding section 34 of electrically conducting material is then positioned over the two-piece, or multi-piece, bobbin 32. The winding section 34 can be wound around the bobbin sections 70 or, where the tooth does not include the enlarged tooth end, can be slidably installed on the bobbin sections 70. The bobbin 32 serves to insulate the winding section 34 from the material of the stacks 28 of tooth laminations 30 and the structural rings 24 that form each tooth 16 for the stator 10. In certain aspects of the device, such as where the tooth 16 does not have the enlarged tooth end, a single-piece bobbin 32 can be used in place of the multi-part bobbin 32 having the bobbin sections 70. In such an aspect of the device, the pre-wound winding section 34 can also be slidably disposed in the bobbin 32.

Referring again to FIGS. 3-9, during formation of the stator 10, a die 130 in the shape of the finished stator 10 can be used for assembling the various components that make up the stator 10. Within the die, a first outer structural ring 80 can be positioned within a base of a die. Tooth laminations 30 can then be added around the die in the position for each tooth 16 of the stator 10. These tooth laminations 30 can be positioned one at a time for each tooth 16 or multiple tooth laminations 30 formed into a stack 28 can be positioned within each die as the various teeth 16 for the stator 10 are built up within the die. The number of tooth laminations 30 within a stack 28 can vary depending on the design of the stator 10. Typically the number of tooth laminations 30 stacked between adjacent structural rings 24 will be consistent. This is to ensure that the structural rings 24 are generally parallel through the stator 10. The number of tooth laminations 30 in a particular stack 28 can be within a range of from approximately 3 tooth laminations to approximately 10 tooth laminations; or from between approximately 5 tooth laminations to approximately 8 tooth laminations; or from approximately 2 tooth laminations to approximately 15 tooth laminations.

Referring again to FIG. 9, typically, a sheet of metallic stock is moved over the die. Successively, the structural rings 24 and the tooth laminations 30 are punched out of the sheet of metallic stock and directed into the die. This sheet stock is made of the ferrous metal that forms the stator 10, as described herein. Using the metal stock, the stator 10 is built layer by layer. The structural ring 24 is punched and disposed in the die. Subsequently, successive layers of the punched tooth laminations 30 are directed into the cavity of the die. In addition, with each punched portion of the sheet of metal stock, an alignment protrusion 90 is punched in each lamination that forms one of the teeth 16 for the stator 10. These protrusions 90 operate in a nesting configuration to lock the layers together to structurally support the stator 10. In this manner, the process of stamping the components of the stator 10 and forming these components into the stator 10 is combined into a single operation.

During formation of the stator 10, the assembly includes two punch configurations. One punch operates to form the structural rings 24 from the sheet of metallic stock. Another punch operates to form the layer of tooth laminations 30. As the stator 10 is built up, layer by layer, the appropriate punch is positioned over the die to punch the next layer of the stator 10 into the die. Again, the punched components are directed into the die immediately after being punched.

During this assembly of the stator 10, the layers of tooth laminations 30 are successively punched into the die to form the stacks 28 of tooth laminations 30 for each tooth 16. Accordingly, these stacks 28 of tooth laminations 30 are formed contemporaneously to maintain a consistent height of each tooth 16 during assembly of the stator 10. Stated another way, as the stator 10 is built up, each position of the die receives one tooth lamination 30 from the sheet of metal stock. In certain aspects of the device, multiple sheets can be punched simultaneously such that the same number of tooth laminations 30 are placed in the die. The structural ring 24 is then punched to rest on a predetermined number of tooth laminations 30 for the plurality of teeth 16 so that each structural ring 24 rests evenly on the various stacks 28 of tooth laminations 30. In this manner, as the teeth 16 for the stator 10 are built up, the laminations and the structural rings 24 are allocated evenly among the tooth 16 positions of the die.

Periodically, additional structural rings 24 are positioned over stacks 28 of tooth laminations 30 to reinforce the structure of the stator 10. When the desired height of the stator 10 is achieved, a final outer structural ring 80 is positioned on the stacks 28 of tooth laminations 30 and at the top of the stator 10 to complete the structure of the stator 10. Through this configuration, the stator 10 is formed from a plurality of tooth laminations 30 that are positioned and reinforced through the use of the intermittent structural rings 24 and a pair of outer structural rings 80.

To assist in the assembly of the various tooth laminations 30 and structural rings 24 for the stator 10, each tooth lamination 30 of the various stator teeth 16 and a portion of the structural rings 24 can be punched to form a protrusion 90. Each protrusion 90 forms a nesting configuration with the adjacent tooth laminations 30. This nesting configuration further positions and reinforces the structure of the stator 10. These protrusions 90 can also act as a locating feature for ensuring that the stacks 28 of tooth laminations 30 are properly aligned with respect to the other tooth laminations 30 as well as the structural rings 24 that form the stator 10. Through the use of the protrusions 90, lateral displacement or misalignment of the tooth laminations 30 and the structural rings 24 is largely minimized or eliminated.

Referring now to FIGS. 10-14, the stator 10 can include a plurality of tooth segments 100. Each tooth segment 100 can be formed from a plurality of tooth laminations 30 that are stacked to form a desired tooth height for the teeth 16 of the stator 10. After the stacked tooth laminations 30 are positioned to form each tooth segment 100, a bobbin 32 is slidably positioned over a tooth portion 102 of the tooth segment 100. A pre-wound tooth winding 14 is then slidably positioned over the bobbin 32 to form a pre-wound stator segment 106.

As discussed herein, the winding section 34 can be placed in the bobbin 32 and the assembled bobbin 32 and winding section 34 can be placed onto the tooth portion 102 of the tooth segment 100 to form a stator segment 106. Each pre-wound stator segment 106 having the pre-attached bobbin 32 and winding section 34 is then coupled to two adjacent pre-wound stator segments 106 to form a stator core 44 with a plurality of pre-wound stator poles 36 that extend inward from the stator core 44. Core portions 104 of the tooth segments 100 include mating geometries that interlock to form the core 44 of the stator 10. The winding sections 34 of each tooth segment 100 are then connected together to form one or more windings 14 of the stator 10. In this manner, a respective winding section 34 of a stator segment 106 is coupled with corresponding winding sections 34 to form a phase of the winding 14 of the plurality of stator segments 106. Typically, the winding 14 has three phases. The phases of the winding 14 and the winding 14 in general defines a plurality of stator poles 36 that are configured to be selectively energized. After the windings 14 are attached together in the desired configuration, an overmold material is disposed over the plurality of stator segments 106 to form an overmold 46 for the stator 10, which is insulated by the overmold 46. In certain aspects of the device, the individual winding sections 34 can be attached together after the overmold 46 is complete. In such a configuration, the wire ends 60 of each winding section 34 can protrude from the overmold 46 and be connected together to form the desired winding configuration.

According to various aspects of the device, the desired winding configuration can be in the form of a single-phase winding, a three-phase winding, stepper motor 12, or other similar motor configuration. Typically, the winding sections 34 are attached together prior to applying the overmold material that forms the insulated stator 10. As discussed herein the winding bracket 48 that is used to attach the winding sections 34 together can be used to define the phase configuration of the winding 14.

Use of the pre-wound winding sections 34 that are attached to tooth sections 26 of the stator 10 provides for more efficient winding of the desired motor configurations. In particular, the winding configurations described herein can achieve a more efficient fill of the slots 110 that are defined between the teeth 16 of the stator 10. Additionally, the configurations described herein allow for the use of larger gauge wire for the pre-wound winding sections 34. Larger gauged wire can be used since the assembly for winding the stator 10 does not need to weave between a stator core 44 having pre-positioned teeth 16 that may be difficult to navigate around and between. The pre-wound winding sections 34 can be formed into the desired shape and can then be slidably disposed onto a respective tooth 16 of the stator 10 or tooth portion 102 of a tooth segment 100. This pre-assembled configuration of the stator segments 106 allows for the finished winding 14 to occupy more of each slot 110 as room is not needed to accommodate an assembly for weaving the wire for the winding 14 around the teeth 16 of the stator 10.

Additionally, the motor 12 formed through the stator 10 described herein does not require the use of rare earth materials similar to permanent magnet motors. Competitive power density is achieved without the use of permanent magnets. Also, the insulated construction described herein through the use of the insulating overmold 46 allows for exposure to corrosive environments without damage to the components of the stator 10 that are surrounded by the overmold material. Because the stator 10 described herein utilizes higher gauge wire and has an increased fill of the slots 110 between the teeth 16, power density is not lost as compared to other conventional electric motor systems.

According to the various aspects of the device, the configurations of the stator 10 described herein can be used with any one of various rotors 18, including the rotor 18 configurations described herein. Additionally, the disclosure of the rotor 18 having the reluctance voids 122, as described herein, is provided as an exemplary and non-limiting type of rotor 18 that can be used in connection with the stator 10 configurations described herein, as well as other types of stators 10.

Referring now to FIGS. 2 and 15-18, the rotor 18 for the synchronous reluctance motor 12 includes a stack 28 of rotor laminations 120 that are typically made from an electrical grade steel to form a rotor body 140. Reluctance voids 122 are punched from the rotor laminations 120 that form the rotor body 140 of the rotor 18. The reluctance voids 122 can also be punched as part of each rotor lamination 120. A single end lamination 124 can be positioned at each opposing end of the rotor 18 to act as a cover. The opposing end laminations 124 are generally solid within the cross section of the rotor 18 and do not include the reluctance voids 122. The opposing end laminations 124 are installed to prevent windage noise that may otherwise occur if the reluctance voids 122 are exposed. Space is typically provided for a drive member, such as a drive shaft. After placement of the end laminations 124, the rotor 18 is then encapsulated with an overmold material that at least partially encapsulates the outer surface 126 of the rotor 18 to form a rotor overmold 128. Typically, the overmold material is in the form of a non-metallic resin material. The resin may also be in the form of a non-magnetic material, such as resin, a polymer, or other similar overmold materials. Because the ends of the rotor 18 are covered by the end laminations 124, the overmold material is not able to infiltrate into the reluctance voids 122. With the reluctance voids 122 being free of the overmold material, the rotor 18 remains balanced with a consistent thickness of the overmold around the rotor body 140. Infiltration of the overmold material into one or more of the reluctance voids 122 can have the effect of causing an imbalance in the rotor 18 that may result in unwanted vibration or wobbling. Accordingly, the shape and size of the reluctance voids 122 can be maintained throughout the assembly and overmold process of the rotor 18. The use of the overmold around the rotor body 140 also limits the occurrence of corrosion within the rotor laminations 120 and the opposing end laminations 124.

During formation of the rotor 18, the connecting webs 150 of the rotor body that define the reluctance voids 122 can be demagnetized, or at least partially demagnetized, to increase the reluctance properties of the rotor 18. Stated another way, demagnetizing the connecting webs 150 decreases the reluctance of the connecting webs 150 to, in turn, provide a more defined path of least reluctance through which the magnetic flux can flow through the rotor 18. This demagnetization of the connecting webs 150 has the effect of making the interaction more effective between the electromagnetic fields produced by the stator 10 and the rotor 18. The demagnetization of the rotor can be accomplished through localized heating, such as with a laser or other heat source, or by imparting additional induced mechanical stresses within the rotor body.

During operation of the stator and rotor, the controller operates to control the delivery of electrical current to the one or more phases of the winding. The controller can also operate in conjunction with a position sensor that monitors the rotational position of the rotor with respect to the stator or the one or more windings of the stator. Commutation of the electrical current can be accomplished by electrically energizing the electromagnetic phases of the winding 14 to selectively attract and align the reluctance of the rotor in a desired direction to induce rotation of the rotor. Additionally, sensor feedback of the position of the rotor delivered to the controller permits a smooth and controllable electrical current to the windings. This, in turn, can be used to control the speed and torque output of the motor.

In certain aspects of the device, the controller operates in a sensorless configuration. In an exemplary and non-limiting aspect of the device, a voltage sensor or voltage monitor can be used at the centerpoint of the back Electro-Motive Force (EMF) voltage. This is compared to typically half of the supplied DC bus voltage to calculate the relative inductances for determining the position of the rotor with respect to the phases of the winding 14. When the position of the rotor is known, a smooth and controllable electrical current to the windings can be used to control the speed and torque of the motor without separate position sensing components.

Referring now to FIGS. 1-19, having described various aspects of the stator 10 and rotor 18 for the electric motor 12, a method 400 is disclosed for forming a stator 10 for an electric motor 12. According to the method 400, a step 402 includes placing a bottom outer structural ring 80 within a die. Layers of stacked tooth laminations 30 are then placed onto the bottom outer structural ring 80 (step 404). Intermittent structural rings 24 are placed in an alternating configuration between adjacent layers of stacked tooth laminations 30 (step 406). As discussed herein, the various tooth laminations 30 are positioned in a contemporaneous fashion with respect to each tooth 16 to maintain a consistent height of each tooth 16 for the stator 10 during assembly of the stator 10. A top outer structural ring 80 is then placed on a top layer of the layers of stacked tooth laminations 30 to form the laminated stator 10 (step 408). The laminated stator 10 is then removed from the die (step 410). A bobbin assembly 76 is positioned on each tooth 16 of the laminated stator 10 (step 412). As described herein, the bobbin 32 can be in the form of a single-piece bobbin 32 or a multi-part bobbin 32 that can be assembled over each tooth 16 of the laminated stator 10. The bobbin assembly 76 can include the bobbin 32 and the pre-wound winding section 34 that can be slidably disposed into the tooth 16 as a single assembly. It is contemplated that the bobbin 32 and the winding section 34 can be sequentially disposed onto the tooth 16, in an alternative aspect. With all of the bobbin assemblies 76 installed on the stator teeth 16, the winding sections 34 form a segmented stator winding. The pre-wound winding sections 34 of the segmented stator winding are then attached using the winding bracket 48 to form the completed stator winding 14 (step 414). An outer ring 38 is placed around the stator winding 14 and the laminated stator 10 (step 416). This outer ring 38 prevents outward movement of the winding sections 34 along each tooth 16 for the stator 10. The laminated stator 10 and the stator winding 14 are then overmolded with an overmold material (step 420). As described herein, the use of pre-wound winding sections 34 provides for greater slot fill and also provides for the use of larger gauge wire that can produce more effective electromagnetic field when energized with an electrical current.

As part of the method 400 for forming the stator 10, the structural rings 24 and the tooth laminations 30 can be made to be less magnetic. By way of example and not limitation, the thin sections, such as the connecting portions of the structural rings 24, can be metallurgically changed to be less magnetic. This is typically performed through heating the steel, such as through use of a laser. In certain aspects of the device, the connecting portions of the structural rings 24 can be upset using a laser or through mechanical de-bridging means to diminish or eliminate the magnetic effect that may be produced by the presence of the connecting portions. It is contemplated that only a portion of the connecting portion are upset or removed to provide structure to the stator 10.

Referring now to FIGS. 1-18 and 20, having described various aspects of the electric motor 12, a method 500 is disclosed for forming a stator 10 for the electric motor 12. According to the method 500, laminated tooth sections 26 are formed (step 502). A bobbin 32 is placed onto a tooth portion 102 of each of the laminated tooth segment 100 (step 504). The pre-wound winding section 34 is then placed on the tooth portion 102 of each laminated tooth segment 100 and over the respective bobbin 32 (step 506). The laminated tooth segments 100 having the pre-wound winding section 34 are then attached together to form a circular core 44 of the stator 10 (step 508). The pre-wound winding sections 34 are then attached together to form the desired configuration of winding 14 for the stator 10 (step 510). The core 44, the teeth 16 and the windings 14 are then overmolded using an overmold material (step 512).

Typically, use of the laminated winding sections 34 that are pre-wound and then attached together is utilized in an inner-rotor configuration that is generally exemplified in FIGS. 11-18. The star configuration of the structural rings 24 for the stator 10, exemplified in FIG. 4, can be used in an inner-rotor configuration or an outer-rotor configuration depending upon the design of the motor 12.

Referring now to FIGS. 1-18 and 21, having described various aspects of the device, a method 600 is disclosed for forming a rotor 18 for an electric motor 12. According to the method 600, steel rotor laminations 120 are formed having the reluctance sections removed from each of the rotor laminations 120 to form reluctance voids 122 (step 602). The rotor laminations 120 are stacked to form the structure of the rotor 18 (step 604). The reluctance sections are aligned to define reluctance voids 122 within the rotor 18. Opposing end laminations 124 or end caps are then disposed on ends of the rotor 18 to enclose the reluctance voids 122 (step 606). As discussed herein, closure of the reluctance voids 122 prevents infiltration of overmold material from entering into and occupying the reluctance voids 122. The rotor 18 is then overmolded with an overmold material (step 608). The opposing end laminations 124, as described herein, prevent infiltration of the overmold material into the reluctance voids 122. This infiltration of overmold material can negatively affect the operation and efficiency of the reluctance voids 122 when operated in conjunction with the energized windings 14 of the stator 10.

The assembly methods described herein for the synchronous reluctance motor 12 allow for bobbin winding 14 of the motor assembly that offers additional and more efficient fill of the slots 110 for the stator 10. The configurations described herein also allow for more efficient use and easier winding 14 of heavier gauge wire and improved slot fill over conventional needle-wound stators 10. Overmolding of the stator 10 and overmolding of the rotor 18 allows for the motor 12 to be exposed to corrosive fluids without corroding the ferrous stator 10 or the ferrous rotor 18. Additionally, as described herein, closing each end of the stack 28 of rotor laminations 120 before overmolding prevents the injection molded non-metallic resin material from flowing into the reluctance voids 122. This infiltration can cause potential rotor imbalance. The use of overmolding with respect to the rotor 18 provides a smooth overmold surface that lowers windage noise that can be caused from voids 122 in the rotor 18 as well as an elimination of "paddle" resistance within wet rotor designs, especially where the voids 122 are exposed to the fluids that may cause increased drag on the rotor 18 as it rotates with a wet-rotor setting.

Additionally, when the non-metallic resin material is overmolded to surround the stator 10 and the windings 14, the overmold material is configured to at least partially encapsulate the inner diameter of the stator teeth 16. As described herein, this configuration provides for use of the stator 10 within liquid and corrosive environments. Use of the overmold 46 at the inner diameter of the stator teeth 16 prevents these materials from corroding or otherwise damaging the laminations of the stator 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An electric motor comprising:

a plurality of structural rings that define a plurality of stator teeth;

tooth sections formed from stacks of laminations that are positioned within each stator tooth of the plurality of stator teeth, wherein the stacks of laminations are positioned between adjacent rings of the plurality of structural rings;

pre-wound bobbins that are positioned over each stator tooth, wherein each pre-wound bobbin includes a winding section of a plurality of winding sections that is disposed onto the pre-wound bobbin, wherein the winding sections are coupled together to define a plurality of stator poles that are configured to be selectively energized, wherein the winding sections are coupled together by a winding bracket that defines subsets of the winding sections that are in electrical communication with one another;

an outer ring that is positioned around an outer circumference of the plurality of stator teeth, wherein the outer ring defines a stator core and contains the winding sections within a stator cavity defined between the outer ring and an inner circumference of the plurality of structural rings; and an overmold that extends around the outer ring, the winding sections, the winding bracket, and the plurality of stator teeth.

2. The electric motor of claim 1, wherein the winding bracket includes a plurality of winding connections that form the subsets of the winding sections, the subsets of the winding sections correspond to phases of the plurality of stator poles.

3. The electric motor of claim 2, wherein the plurality of winding connections includes three winding connections that correspond to three phases of the plurality of stator poles.

4. The electric motor of claim 1, wherein the pre-wound bobbins are slidably installed onto a corresponding stator tooth of the plurality of stator teeth.

5. The electric motor of claim 1, further comprising:

a rotor that includes a rotor body defined by a plurality of laminations; and opposing end laminations that are positioned at opposing ends of the rotor body, wherein the opposing end laminations are configured to reduce windage noise during operation of the rotor within a rotor cavity defined within the plurality of stator teeth.

6. The electric motor of claim 1, further comprising:

a rotor having a plurality of reluctance voids defined within a rotor body of the rotor and opposing end laminations that enclose the plurality of reluctance voids within the rotor body.

7. A motor comprising:

a plurality of pre-wound stator segments having a plurality of winding sections and a plurality of bobbins, each pre-wound stator segment of the plurality of pre-wound stator segments comprising:

stacked tooth laminations that form a core portion and a tooth portion;

a bobbin of the plurality of bobbins that is slidably positioned over the tooth portion of the stacked tooth laminations; and a respective winding section of the plurality of winding sections that is positioned around the bobbin; wherein:

each pre-wound stator segment is coupled to two adjacent pre-wound stator segments to form an outer ring with each tooth portion extending inward, wherein each core portion forms a portion of the outer ring; and the plurality of winding sections are coupled to form at least one phase winding of the plurality of pre-wound stator segments, wherein the at least one phase winding defines a plurality of stator poles that are configured to be selectively energized.

8. The motor of claim 7, wherein each pre-wound stator segment includes the bobbin and the respective winding section pre-attached when coupled with the two adjacent pre-wound stator segments.

9. The motor of claim 7, wherein an electrically conductive material is wound around the bobbin and the tooth portion to form the respective winding section.

10. The motor of claim 7, wherein an overmold is disposed over the plurality of pre-wound stator segments to form an overmolded stator.

11. The motor of claim 7, wherein the plurality of winding sections are coupled together by a winding bracket that defines subsets of the plurality of winding sections that are in electrical communication with one another.

12. The motor of claim 11, wherein the winding bracket includes a plurality of winding connections that form the subsets of the plurality of winding sections, the subsets of the plurality of winding sections corresponding to phases of the plurality of stator poles.

13. The motor of claim 7, further comprising:

a rotor that includes a rotor body defined by a plurality of laminations; and opposing end laminations that are positioned at opposing ends of the rotor body, wherein the opposing end laminations are configured to reduce windage noise during operation of the rotor within a rotor cavity defined within the plurality of pre-wound stator segments.

14. The motor of claim 13, wherein the rotor body includes a plurality of reluctance voids that are defined within the plurality of laminations, and wherein the opposing end laminations enclose the plurality of reluctance voids within the rotor body.

15. The motor of claim 14, wherein the rotor body includes connecting webs of material that form the plurality of reluctance voids, wherein the connecting webs are demagnetized to decrease a reluctance of the connecting webs.

16. A method for forming a rotor for an electric motor, the method comprising:

forming rotor laminations having reluctance sections removed from each of the rotor laminations;

stacking the rotor laminations to form a rotor body, wherein connecting webs of the reluctance sections are aligned to define reluctance voids within the rotor body;

disposing opposing end caps on the rotor body to enclose the reluctance voids and maintain spaces of the reluctance voids; and overmolding the rotor body with an overmold material, wherein the opposing end caps prevent infiltration of the overmold material into the spaces of the reluctance voids.

17. The method of claim 16, further comprising a step of:

demagnetizing the connecting webs of the rotor body to reduce reluctance of the reluctance sections.

18. The motor of claim 7, wherein the tooth portion of the pre-wound stator segment includes an enlarged tooth end, and wherein the bobbin is positioned between the core portion and the enlarged tooth end.

19. The motor of claim 18, wherein the bobbin is a two-part bobbin that is disposed between the core portion and the enlarged tooth end of the tooth portion.

20. The motor of claim 19, wherein the winding section secures the two-part bobbin onto the pre-wound stator segment.

* * * * *